US012809397B2

(12) United States Patent
Rakshit et al.

(10) Patent No.: US 12,809,397 B2
(45) Date of Patent: Nov. 24, 2026

(54) INTEGRATION OF A SET OF ROBOTS TO PERFORM AN ACTIVITY

(71) Applicant: International Business Machines Corporation, Armonk, NY (US)

(72) Inventors: Sarbajit Kumar Rakshit, Kolkata (IN); Manikandan Padmanaban, Chennai (IN); Jagabondhu Hazra, Bangalore (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 18/794,197

(22) Filed: Aug. 5, 2024

(65) Prior Publication Data

US 2026/0037003 A1 Feb. 5, 2026

(51) Int. Cl.

*G05D 1/69* (2024.01)
*G05D 1/224* (2024.01)
*G05D 1/648* (2024.01)
*G05D 101/10* (2024.01)

(52) U.S. Cl.

CPC ............. *G05D 1/69* (2024.01); *G05D 1/2245* (2024.01); *G05D 1/648* (2024.01); *G05D 2101/10* (2024.01)

(58) Field of Classification Search

CPC ........ G05D 1/2245; G05D 1/648; G05D 1/69; G05D 2101/10

See application file for complete search history.

(56) References Cited

U.S. PATENT DOCUMENTS

2016/0325433 A1 11/2016 Hashimoto
2017/0057081 A1* 3/2017 Krohne ................ B25J 11/0085
2020/0016754 A1* 1/2020 Skubch .................. B25J 9/1682
2020/0282549 A1* 9/2020 Torii ...................... B25J 9/1661
2021/0053221 A1* 2/2021 Jagannath ............ G06N 3/0499
2022/0048204 A1 2/2022 Sohmshetty et al.
2022/0305646 A1* 9/2022 Jain ........................ B25J 9/1671
2024/0160229 A1* 5/2024 Rana ...................... G05D 1/693
2024/0189996 A1* 6/2024 Lu .......................... B25J 9/1656

FOREIGN PATENT DOCUMENTS

CN 101364110 B 8/2010
CN 205870513 U 1/2017
WO 2023280365 A1 1/2023

OTHER PUBLICATIONS

Li, H., Wan, G., Li, H., Sharf, A., Xu, K., & Chen, B. (Aug. 2016). Mobility fitting using 4d ransac. In Computer Graphics Forum (vol. 35, No. 5, pp. 79-88). Accessed Mar. 3, 2026 (Year: 2016).*

(Continued)

*Primary Examiner* — Blake A Wood

(74) *Attorney, Agent, or Firm* — CHIP LAW GROUP

(57) ABSTRACT

Integration of a set of robots to perform an activity includes obtaining a mobility parameter of each of a plurality of robots. The collective mobility of the set of robots from the plurality of robots is determined. The set of robots are integrated in an environment to perform an activity in case the collective mobility satisfies a target mobility threshold. The set of robots further performs, based on the integration of the set of robots, the activity in the environment.

19 Claims, 13 Drawing Sheets

(56) References Cited

OTHER PUBLICATIONS

Junjie Tai, "A design of intelligent AGV system combined with a robotic arm for flexible production lines", Proceedings of the 2023 International Conference on Machine Learning and Automation, DOI: 10.54254/2755-2721/34/20230304, 11 pages.
Lindqvist et al., "Multimodality robotic systems: Integrated combined legged-aerial mobility for subterranean search-and-rescue", Robotics and Autonomous Systems, vol. 154, Aug. 2022, 104134, journal homepage: www.elsevier.com/locate/robot, 15 pages.
Gianni et al., "Role and task allocation framework for Multirobot collaboration with latent knowledge estimation", Aug. 10, 2020, 45 pages, https://onlinelibrary.wiley.com/doi/full/10.1002/eng2.12225.
Jung Jaeseok, "How to combine multiple curves into one curve or extend an existing curve", Apr. 20, 2023, 04 pages, https://functionbay.com/en/faq/single/963.
Malla Upendrakumar, "Flexible Couplings—Types of couplings Part—1", Mar. 5, 2023, 02 pages.
Mobley R Keith, "Flexible Couplings", 2001, Plant Engineer's Handbook, 26 pages, https://www.sciencedirect.com/topics/engineering/flexible-couplings.
No Author, "3D Curve Fitting With Python", Jul. 23, 2025, 06 pages, https://www.geeksforgeeks.org/python/3d-curve-fitting-with-python/.
No Author, "fit a curve in a three dimensional space", Oct. 21, 2013, 05 pages, https://mathematica.stackexchange.com/questions/34480/fit-a-curve-in-a-three-dimensional-space.
Saha et al., "Multi-Robot Motion Planning by Incremental Coordination", 2006 IEEE/RSJ International Conference on Intelligent Robots and Systems, Oct. 9-15, 2006, 05 pages.
Yi et al., "PuzzleBots: Physical Coupling of Robot Swarms", 2021 IEEE International Conference on Robotics and Automation (ICRA), May 30, 2021-Jun. 5, 2021, 07 pages.

* cited by examiner

INTEGRATION OF A SET OF ROBOTS TO PERFORM AN ACTIVITY

BACKGROUND

The disclosure relates to robotic systems and more particularly, to utilizing robots to perform an activity.

With the rapid advancements in technology, the use of robotic systems has become increasingly prevalent in various industries and fields. The robotic systems are equipped with multiple sensors, Artificial Intelligence (AI), and advanced mechanical capabilities to enhance task performance and make the processes of performing the task more efficient, and cost-effective. Further, one of the key reasons for the increased use of robotic systems is the ability of the robotic systems to perform multiple tasks that are either too dangerous or too monotonous for humans. For example, robotic systems are used in multiple industries, such as construction, agriculture, manufacturing, and the like for performing tasks, such as heavy lifting, welding, repetitive assembly line work, and the like. The performance of tasks via the robotic systems reduces the risk of injuries to human workers, saves time and effort of the human workers.

SUMMARY

According to an embodiment of the disclosure, a computer-implemented method for integration of a set of robots to perform an activity is described. The computer-implemented method includes obtaining, by a computer, a mobility parameter for each of a plurality of robots. The computer-implemented method further includes determining, by the computer, a collective mobility of a set of robots from the plurality of robots. The collective mobility of the set of robots is a combination of the mobility parameter of each robot in the set of robots. Further, the computer-implemented method includes determining that the collective mobility of the set of robots satisfies a target mobility threshold. The computer-implemented method further includes configuring, by the computer, the set of robots to integrate in an environment for performing an activity. The integration is performed based on a determination that the collective mobility of the set of robots satisfies the target mobility threshold. The target mobility threshold is indicative of a mobility for performing the activity in the environment based on one or more environmental characteristics. The computer-implemented method further includes configuring, by the computer, the set of robots to perform, based on the integration of the set of robots, the activity in the environment.

According to one or more embodiments of the disclosure, a system for integration of a set of robots to perform an activity is described. The system performs a method for integration of a set of robots to perform an activity. The method includes obtaining a mobility parameter of a primary robot. The method further includes determining a collective mobility of the primary robot and one or more secondary robots from a plurality of robots using an Artificial Intelligence (AI) model. The collective mobility of the primary robot and the one or more secondary robots is a combination of the mobility parameter of the primary robot and the mobility parameter of the one or more secondary robots. The method includes determining that the collective mobility of the set of robots satisfies a target mobility threshold. The method further includes selecting the one or more secondary robots to perform an activity based on a determination that the collective mobility of the set of robots satisfies the target mobility threshold. The target mobility threshold is indicative of a mobility for performing the activity in an environment based on one or more environmental characteristics. The one or more robots are selected for enabling the primary robot to perform the activity in the environment The method further includes configuring the primary robot and the selected one or more secondary robots to integrate in the environment. Further, the method includes configuring the primary robot and the selected one or more secondary robots to perform, based on the integration of the primary robot and the one or more secondary robots, the activity in the environment.

According to one or more embodiments of the disclosure, a computer program product for integration of a set of robots to perform an activity is described. The computer program product includes a computer-readable storage medium having program instructions embodied therewith, the program instructions executable by a system to cause the system to obtain a mobility parameter for each of a plurality of robots. The program instructions further include determining the collective mobility of a set of robots from the plurality of robots. The collective mobility of the set of robots is a combination of the mobility parameter of each robot in the set of robots. The program instructions also include determining that the collective mobility of the set of robots satisfies a target mobility threshold. The program instructions further include configuring the set of robots to integrate in an environment for performing the activity. The integration is performed based on a determination that the collective mobility of the set of robots satisfies the target mobility threshold. The target mobility threshold is indicative of a mobility for performing the activity in the environment based on one or more environmental characteristics. The program instructions further include configuring the set of robots to perform, based on the integration of the set of robots, the activity in the environment.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein.

DETAILED DESCRIPTION

Figure 1:
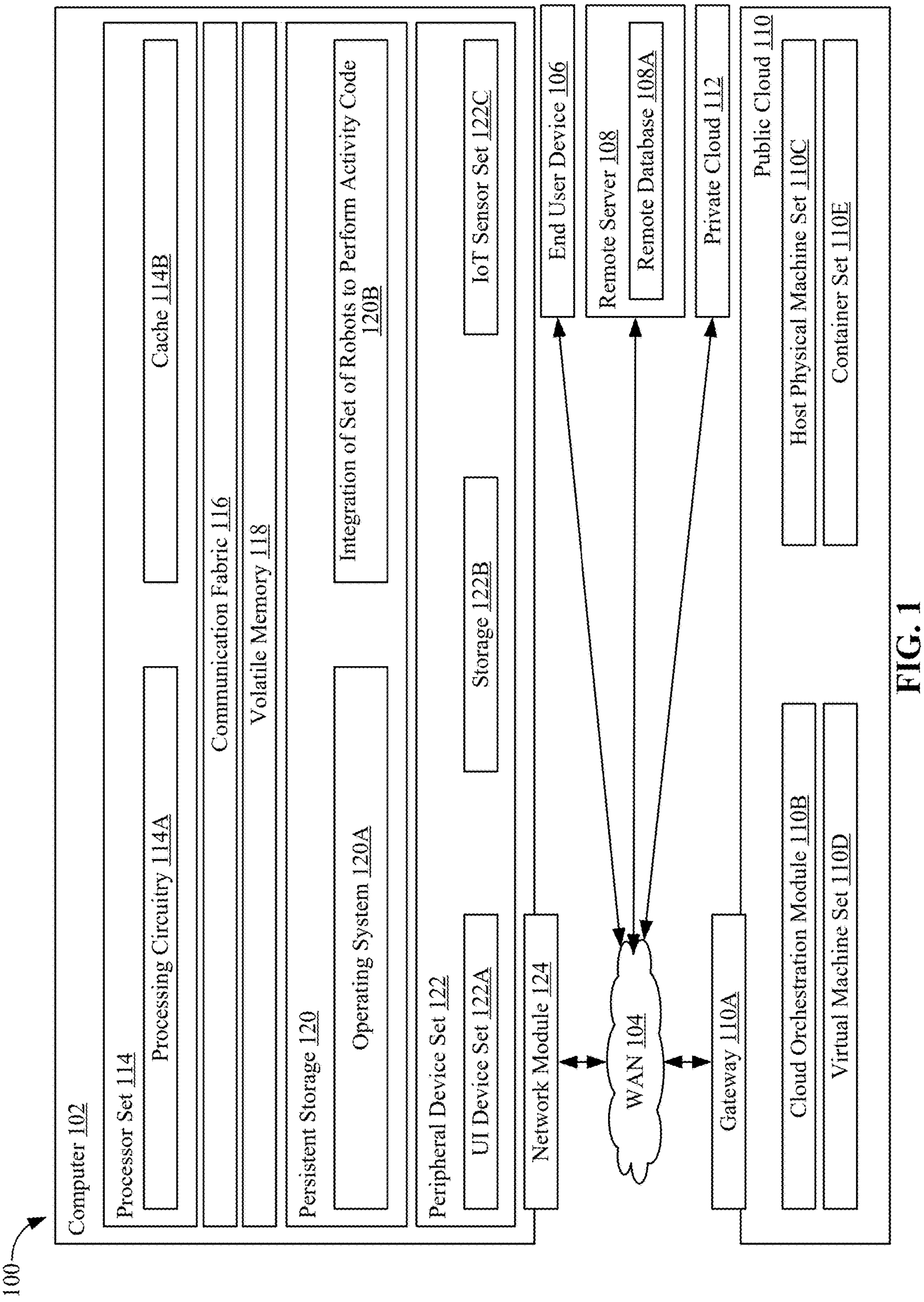
FIG. 1 is a diagram that illustrates a computing environment for integration of a set of robots to perform an activity, in accordance with an embodiment of the disclosure.

In modern industrial settings, execution of complex activities requires the collaborative involvement of multiple types of robots. Robot-based industrial activity execution represents a paradigm shift in manufacturing and automation. Different robots, each specialized in distinct tasks such as welding, assembly, material handling, and the like, work in tandem to achieve a seamless and an efficient workflow. These robots, equipped with diverse end-effectors and functionalities, achieve versatility and precision in the production process. The integration of multiple robotic systems requires meticulous planning, considering factors such as task allocation, communication protocols, and real-time monitoring. Such synchronized efforts of the multiple robotic systems contribute to increased productivity, faster task completion, and enhanced overall operational efficiency. The integration of the multiple robotic systems not only enhances industrial processes but also opens the door to a new era of flexible and adaptive manufacturing systems.

Further, the robotic systems are designed with specific mobility capabilities to perform a certain activity. However, the mobility capabilities prevent the robotic systems from reaching certain areas that are inaccessible or difficult to navigate. For example, the robotic systems may not be able to traverse rough terrain, maneuver around obstacles such as debris or walls, climb stairs, and the like. As a result, there may be specific limitations on the locations and points of interests that the robotic systems can reach limiting the effectiveness of the robotic systems in certain scenarios. Thus, the robotic systems fail to operate in specific situations where the desired point of interest is in a hard-to-reach or hazardous location. For example, a robotic arm is unable to reach certain locations in an industrial environment limiting the types of activities the robotic arm can perform effectively.

To address these issues, there is a need for an automated system that can facilitate integration of a set of robots in the environment and facilitate the performance of the activities via the integrated set of robots. Such an automated system may leverage machine learning models and real-time monitoring to provide a comprehensive solution for integration of the set of robots to perform the activity.

Current robotic systems are characterized by restricted mobility when performing operational tasks. Further, the current robotic systems are designed to operate within specific environments or spaces, such as hospital rooms, factory floors, outdoor fields, and the like. Thus, the mobility of the current robotic systems is often restricted to these predefined areas due to limitations in navigation capabilities, terrain adaptability, or operational constraints. While some of the current robotic systems can navigate autonomously, the current robotic systems require clear paths or structured environments to move efficiently. Further, the current robotic systems include sensors to detect obstacles. However, navigating complex or dynamic environments (e.g., rough terrain, crowded spaces, and the like) can be challenging and may limit the mobility of the current robotic systems. Furthermore, the design of current robotic systems, including their shape, size, and type of locomotion (e.g., legs, wheels, tracks, and the like), can also affect their mobility. For example, robotic systems with wheels may struggle on uneven terrain or stairs whereas legged robots may have difficulty with stability or require more energy to move. The current robotic systems are also limited in their ability to dynamically adapt to changes or unforeseen circumstances while performing their activities. As a result, the current robotic systems may not be able to readily adjust their actions or behavior in response to added information or environmental changes during operation. For example, a robot designed for manufacturing tasks may struggle to manage unexpected variations in the production process or environment, resulting in delays or errors.

Robotic systems can be of several types such as a robotic arm. The robotic arm includes a base, a set of joints, and a gripper. Further, the robotic arm corresponds to a mechanical arm designed to perform an activity, for example welding. The robotic arm is associated with a predefined degree of freedom. Furthermore, the degree of freedom of the robotic arm is based on the range of motion and movement of the robotic arm. The robotic arm is mounted on the base. The base is a frame, or a pedestal bolted to a stable surface. Further, the gripper corresponds to a mechanical device configured to interact with objects in the environment. For example, the gripper is a welding device that may interact with the objects in the environment to perform the activity of welding. In an embodiment, the robotic arm is required to perform the activity at a location not in the range of motions and movement of the robotic arm. For the robotic arm to perform the activity at the location, the robotic arm is required to integrate with one or more other/secondary robots. Details about the integration of robots are provided, for example, in FIG. 2 and FIG. 3.

The proposed system aims to integrate a set of robots to perform an activity in the environment. However, determining qualified integration, considering movement types and speeds of the set of robots to perform the activity, is complex. The proposed system aims to efficiently allocate paired robotic systems based on resultant mobility capabilities, addressing the dynamic and diverse mobility requirements of industrial activities, and ensuring effective performance at designated locations.

The core components of the disclosed system utilize a knowledge corpus and artificial intelligence algorithms to determine the collective mobility of the set of robots and other relevant data to integrate the set of robots and perform the activity in the environment via the integration of set of robots. As a result, the disclosed system enhances the mobility capabilities of robotic systems and improves the performance of the robotic systems by enabling them to perform a wide range of tasks in various environments. Moreover, the disclosed system continuously monitors the environment and the set of robots to determine whether the set of robots have successfully performed the activity. In a case where the set of robots failed to perform the activity, the disclosed system configures at least one robot different from the set of robots to perform the activity in the environment based on integration of the at least one robot.

This integrated approach of using multiple robots to perform the activity in the environment results in increased mobility and versatility in the functionality of robots due to the capability of integrated robotic systems to move through multiple points of interest. Further, this increased mobility enables the robotic systems to perform a wide range of tasks and operate in various environments that were previously inaccessible to the robotic systems. For example, robots designed for search and rescue missions can move through various levels of a building or traverse difficult terrain to locate and assist individuals in need. This increased mobility allows for quicker response times and a higher success rate in these critical situations.

According to an embodiment of the disclosure, a computer-implemented method for integration of a set of robots to perform an activity is described. The computer-implemented method includes obtaining, by a computer, a mobility parameter for each of a plurality of robots. The computer-implemented method further includes determining, by the computer, the collective mobility of a set of robots from the plurality of robots. The collective mobility of the set of robots is a combination of the mobility parameter of each robot in the set of robots. Further, the computer-implemented method includes determining that the collective mobility of the set of robots satisfies a target mobility threshold. The computer-implemented method further includes configuring, by the computer, the set of robots to integrate in an environment for performing an activity. The integration is performed based on a determination that the collective mobility of the set of robots satisfies the target mobility threshold. The target mobility threshold is indicative of a mobility that may be needed (or required) for performing the activity in the environment based on one or more environmental characteristics. The computer-implemented method further includes configuring, by the computer, the set of robots to perform, based on the integration of the set of robots, the activity in the environment.

In other embodiments of the disclosure, the computer-implemented method further includes receiving, by the computer, a user command to perform the activity within the environment. The computer-implemented method further includes generating, by the computer, a virtual representation of the environment based on the one or more environmental characteristics and the received user command. The computer-implemented method further includes computing, by the computer, the target mobility threshold for performing the activity in the environment. The target mobility threshold is computed based on the generated virtual representation and the received user command.

In generation of the virtual representation of the environment, the computer-implemented method includes obtaining, by the computer, the one or more environmental characteristics using a set of sensors installed within the environment, prestored environment knowledge, or a combination thereof. The computer-implemented method further includes determining, by the computer, one or more activity parameters associated with the activity based on predefined activity information, the received user command and the obtained one or more environmental characteristics. Further, the computer-implemented method includes generating, by the computer, the virtual representation of the environment based on the obtained one or more environmental characteristics and the determined one or more activity parameters. The virtual representation corresponds to a digital representation of the environment including a position of one or more obstacles, a position of one or more workpieces, and a position and an orientation of the plurality of robots in the environment.

In other embodiments of the disclosure, the computer-implemented method further includes segmenting, by the computer, the activity into a set of sub-activities based on the generated virtual representation of the environment. The computer-implemented method further includes allocating, by the computer, a corresponding sub-activity from the segmented set of sub-activities to one or more robots from the set of robots for performing the corresponding sub-activity. The corresponding sub-activity is allocated based on the generated virtual representation of the environment, one or more robotic parameters associated with each of the set of robots, the target mobility threshold, and an integration feasibility of the set of robots to perform the activity.

In other embodiments of the disclosure, the computer-implemented method further includes obtaining, by the computer, one or more robotic parameters associated with each of the plurality of robots available in the environment from a storage unit. The computer-implemented method further includes selecting, by the computer, the set of robots from the plurality of robots qualified for completing the activity based on the obtained one or more robotic parameters of each of the plurality of robots, one or more activity parameters, and the generated virtual representation of the environment. The set of robots includes a primary robot and one or more secondary robots.

In the selection of the set of robots from the plurality of robots, the computer-implemented method includes selecting, by the computer, the primary robot from the plurality of robots qualified for completing the activity based on the one or more robotic parameters of each of the plurality of robots, the one or more activity parameters, the target mobility threshold, and the generated virtual representation of the environment. The computer-implemented method further includes determining, by the computer, the selected primary robot is incapable of performing the activity in the environment by comparing the one or more robotic parameters of the primary robot with the target mobility threshold. Further, the computer-implemented method includes selecting, by the computer, the one or more secondary robots from the plurality of robots to be integrated with the primary robot based on determining that the selected primary robot is incapable of performing the activity in the environment. The one or more secondary robots are determined by correlating the one or more robotic parameters of each of the plurality of robots, the one or more activity parameters, the target mobility threshold, the generated virtual representation of the environment, and integration feasibility of the primary robot and the one or more secondary robots to perform the activity.

In other embodiments of the disclosure, the one or more activity parameters include a priority of the activity, a context of the activity, a category, a sub-category of the activity, or any combination thereof.

In other embodiments of the disclosure, the one or more environmental characteristics include a location of one or more Region of Interests (ROIs) associated with the activity within the environment, one or more obstacles in the environment, one or more workpieces located in the environment, a specification of the environment, a position, an orientation of each of the plurality of robots in the environment, or any combination thereof.

In the determination of the collective mobility of the set of robots, the computer-implemented method includes generating, by the computer, a set of point clouds associated with the obtained mobility parameter for each of the set of robots. The mobility parameter corresponds to the ability of each of the set of robots to move and navigate in the environment to perform the activity. The set of point clouds corresponds to data points representing reachable positions and orientations of the set of robots in the environment. Further, the computer-implemented method includes determining, by the computer, a set of coupling points associated with each of the set of robots based on the generated set of point clouds. The computer-implemented method further includes merging, by the computer, the generated set of point clouds for each of the set of robots based on the determined set of coupling points. Further, the computer-implemented method includes determining the collective mobility of the set of robots based on a result of the merging of the generated set of point clouds.

In other embodiments of the disclosure, the one or more robotic parameters include the mobility parameter, one or more additional parameters associated with each of the set of robots, or a combination thereof. Further, the mobility parameter includes a degree of freedom of the set of robots, a type of movement of the set of robots, a range of motion and flexibility in each of joints of the set of robots, an acceleration and deceleration of the set of robots, speed ranges of the set of robots, an agility of the set of robots, or any combination thereof. Furthermore, the one or more additional parameters include a dimensional specification of the set of robots (for e.g., arm length), a number and types of joints of the set of robots, a payload capacity of the set of robots, one or more spatial constraints of the set of robots, an external force handling capability of the set of robots, precision and an accuracy of each of the set of robots for performing the activity, types of tools attached with the set of robots, or any combination thereof.

In other embodiments of the disclosure, the collective mobility of the set of robots is determined using a 3D curve fitting technique.

In other embodiments of the disclosure, the computer-implemented method further includes obtaining, by the computer, a set of inputs associated with the set of robots from a set of sensors while the set of robots are performing the activity in the environment. The computer-implemented method further includes determining, by the computer, that the set of robots failed to perform the activity in the environment based on the obtained set of inputs. Further, the computer-implemented method further includes selecting, by the computer, at least one robot from the plurality of robots based on determining that the set of robots failed to perform the activity in the environment. The at least one robot is selected based on the target mobility threshold, one or more robotic parameters, and the one or more environmental characteristics. Furthermore, the computer-implemented method includes integrating, by the computer, the selected at least one robot. The computer-implemented method includes configuring, by the computer, the selected at least one robot to perform the activity in the environment based on integration of the selected at least one robot. The integration of the selected at least one robot is performed based on the target mobility threshold, the collective mobility of the at least one robot, the one or more robotic parameters, and the one or more environmental characteristics.

In the configuration of the set of robots to integrate, the computer-implemented method includes validating, by the computer, that stability of the set of robots is satisfying a target stability threshold that may be needed (or required) for performing the activity in the environment. The validation is performed using a digital twin simulation technique based on one or more types of forces encountered by the set of robots. Further, the computer-implemented method includes determining, by the computer, a type of integration to be performed between the set of robots based on the target mobility threshold, the collective mobility of the set of robots and the one or more environmental characteristics. The type of integration is determined based on validating that the stability of the integrated set of robots is satisfying the target stability threshold. The computer-implemented method further includes configuring, by the computer, the set of robots to integrate in the environment for performing the activity based on the type of integration.

In other embodiments of the disclosure, the type of integration corresponds to a flexible coupling or a rigid coupling.

According to one or more embodiments of the disclosure, a system for integration of a set of robots to perform an activity is described. The system performs a method for integration of a set of robots to perform an activity. The method includes obtaining a mobility parameter of a primary robot. The method further includes determining a collective mobility of the primary robot and one or more secondary robots from a plurality of robots using an Artificial Intelligence (AI) model. The collective mobility of the primary robot and the one or more secondary robots is a combination of the mobility parameter of the primary robot and the mobility parameter of the one or more secondary robots. The method includes determining that the collective mobility of the set of robots satisfies a target mobility threshold. The method further includes selecting the one or more secondary robots to perform an activity based on a determination that the collective mobility of the set of robots satisfies the target mobility threshold. The target mobility threshold is indicative of a mobility that may be needed (or required) for performing the activity in an environment based on one or more environmental characteristics. The one or more robots are selected for enabling the primary robot to perform the activity in the environment. The method further includes configuring the primary robot and the selected one or more secondary robots to integrate in the environment. Further, the method includes configuring the primary robot and the selected one or more secondary robots to perform, based on the integration of the primary robot and the one or more secondary robots, the activity in the environment.

In other embodiments of the disclosure, the system further includes determining that the obtained mobility parameter of the primary robot failed to satisfy the target mobility threshold.

In the selection of the one or more secondary robots, the system includes selecting, based on a determination that the obtained mobility parameter of the primary robot failed to satisfy the target mobility threshold, the one or more secondary robots from a plurality of robots to be integrated with the primary robot for performing the activity in the environment. The one or more secondary robots are selected based on one or more robotic parameters of each of the plurality of robots, one or more activity parameters, the target mobility threshold, a virtual representation of the environment, and an integration feasibility of the primary robot and the one or more secondary robots to perform the activity.

In other embodiments of the disclosure, the one or more environmental characteristics include a location of one or more Region of Interests (ROIs) associated with the activity within the environment, one or more obstacles in the environment, one or more workpieces located in the environment, a specification of the environment, a position or an orientation of each of the plurality of robots in the environment.

In other embodiments of the disclosure, the mobility parameter includes a degree of freedom of the set of robots, a type of movement of the set of robots, a range of motion and flexibility in each of joints of the set of robots, an acceleration and deceleration of the set of robots, speed ranges of the set of robots, an agility of the set of robots, or any combination thereof.

According to one or more embodiments of the disclosure, a computer program product for integration of a set of robots to perform an activity is described. The computer program product includes a computer-readable storage medium having program instructions embodied therewith, the program instructions executable by a system to cause the system to obtain a mobility parameter for each of a plurality of robots. The program instructions further include determining the collective mobility of a set of robots from the plurality of robots. The collective mobility of the set of robots is a combination of the mobility parameter of each robot in the set of robots. The program instructions also include determining that the collective mobility of the set of robots satisfies a target mobility threshold. The program instructions further include configuring the set of robots to integrate in an environment for performing the activity. The integration is performed based on a determination that the collective mobility of the set of robots satisfies the target mobility threshold. The target mobility threshold is indicative of a mobility that may be needed (or required) for performing the activity in the environment based on one or more environmental characteristics. The program instructions further include configuring the set of robots to perform, based on the integration of the set of robots, the activity in the environment.

Various aspects of the disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium is an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for integration of a set of robots to perform an activity, in accordance with an embodiment of the disclosure. With reference to FIG. 1, there is shown a computing environment 100 that contains an example of an environment for the execution of at least some of the computer code involved in performing the disclosed methods, such as code 120B for integrating a set of robots to perform an activity. In addition to the code 120B for integrating a set of robots to perform an activity, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the integration of set of robots to perform activity code 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch, a robot, or other wearable computer, a mainframe computer, a quantum computer, or any other form of a computer or a mobile device now known or to be developed in the future that is capable of running a program, accessing a network or querying a database, such as a remote database 130. As is well understood in the art of computer technology, and depending upon the technology, the performance of a computer-implemented method is distributed among multiple computers and/or between multiple locations. On the other hand, in this presentation of the computing environment 100, detailed discussion is focused on a single computer, specifically the computer 102, to keep the presentation as simple as possible. The computer 102 is located in a cloud, even though it is not shown in a cloud in FIG. 1. On the other hand, computer 102 is not required to be in a cloud except to any extent as is affirmatively indicated.

The processor set 114 includes one, or more, computer processors of any type now known or to be developed in the future. The processing circuitry 114A is distributed over multiple packages, for example, multiple, coordinated integrated circuit chips. The processing circuitry 114A may implement multiple processor threads and/or multiple processor cores. The cache 114B is memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 is located "off-chip." In some computing environments, the processor set 114 is designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in several types of computer-readable storage media, such as the cache 114B and the other storage media discussed below. The program instructions, and associated data, are accessed by the processor set 114 to control and direct the performance of the disclosed methods. In computing environment 100, at least some of the instructions for performing the disclosed methods are stored in the dynamic modification of the integration of set of robots to perform activity code 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths are used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 is distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 is a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the integration of set of robots to perform activity code 120B typically includes at least some of the computer code involved in performing the disclosed methods.

The peripheral device set 122 includes the set of peripheral devices of computer 102. Data communication connections between the peripheral devices and the other components of computer 102 is implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B is persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage is provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor is a thermometer, and another sensor is a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In other embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 is replaced and/or supplemented by local area networks (LANs) designed to communicate data between devices located in a local area, such as a Wi-Fi network. The WAN

104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 is a client device, such as a thin client, heavy client, mainframe computer, desktop computer, and so on.

The remote server 108 is any computer system that serves at least some data and/or functionality to the computer 102. The remote server 108 is controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data is provided to the computer 102 from the remote database 130 of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economics of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs are stored as images and is transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in other embodiments of the disclosure, a private cloud is disconnected from the internet entirely and only accessible through a local/private network. A hybrid cloud is a composition of multiple clouds of diverse types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
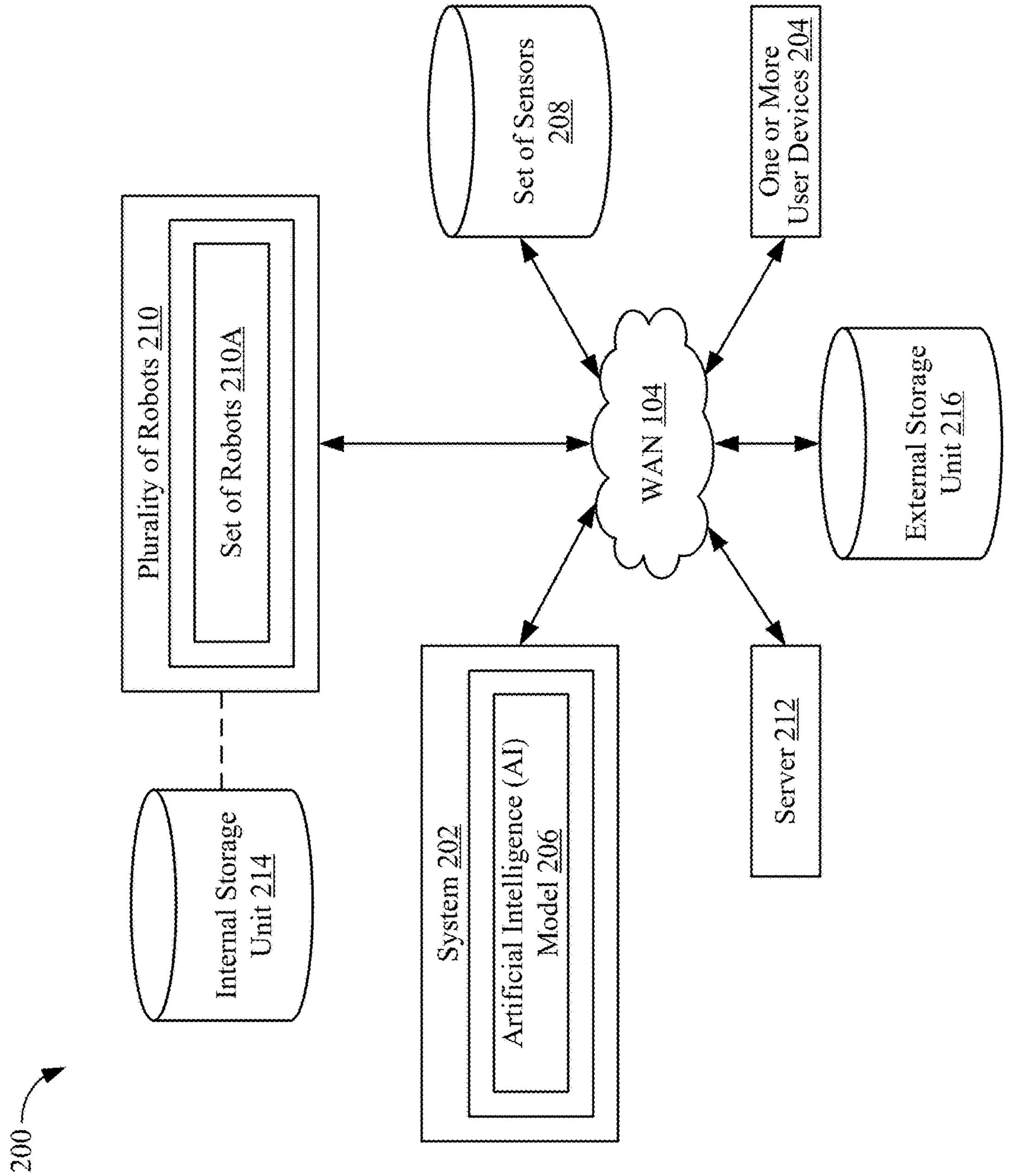
FIG. 2 is a diagram that illustrates an environment for integration of the set of robots to perform the activity, in accordance with an embodiment of the disclosure.

FIG. 2 is a diagram that illustrates an environment for integration of the set of robots to perform the activity, in accordance with an embodiment of the disclosure. FIG. 2 is explained in conjunction with elements from FIG. 1. With reference to FIG. 2, there is shown a diagram of a network environment 200. The network environment 200 includes a system 202, one or more user devices 204, an Artificial Intelligence (AI) Model 206, and a set of sensors 208. There is further shown a plurality of robots 210, a set of robots 210A, and a server 212. Further, the network environment 200 also includes a storage unit, such as an internal storage unit 214, an external storage unit 216, or a combination thereof. The network environment 200 further includes a WAN 104 of FIG. 1. In an embodiment, the system 202 is an exemplary embodiment of the computer 102 in FIG. 1.

The system 202 may include suitable logic, circuitry, interfaces, and/or code that is configured for integration of the set of robots 210A to perform the activity. In an embodiment, the robot performs a wide range of activities, such as welding, painting, assembling, packaging, and the like.

The system 202 is configured to obtain a mobility parameter of each of a plurality of robots 210. The system 202 is configured to determine the collective mobility of the set of robots 210A from the plurality of robots 210. The collective mobility of the set of robots 210A is a combination of the mobility parameter of each robot in the set of robots 210A. The system 202 is further configured to determine that the collective mobility of the set of robots satisfies a target mobility threshold. The system 202 is further configured to configure the set of robots 210A to integrate in an environment to perform the activity. The integration is performed based on a determination that the collective mobility of the set of robots satisfies the target mobility threshold. The target mobility threshold is indicative of a mobility for performing the activity in the environment based on one or more environmental characteristics. The system 202 is further configured to configure the set of robots 210A to perform, based on the integration of the set of robots 210A, the activity in the environment. Examples of the system 202 may include, but are not limited to, a server, a computing device, a virtual computing device, a robot, a mainframe machine, a computer workstation, a smartphone, a cellular phone, a mobile phone, a gaming device, or a consumer electronic (CE) device.

Further, the one or more user devices 204 include suitable logic, circuitry, interfaces, and/or code configured to receive a user command from a user and transmit the received user command to the system 202 for performing the activity. In an embodiment, the one or more user devices 204 includes a display screen for receiving the user command from the user. The one or more user devices 204 are communicatively coupled with the system 202 via the WAN. In an embodiment, each of the one or more user devices 204 is an exemplary embodiment of the EUD 106. Examples of the one or more user devices 204 may include, but are not limited to, a computing device, a mainframe machine, a server, a computer work-station, a robotic system, a smartphone, a cellular phone, a mobile phone, a gaming device, a consumer electronic (CE) device, a head-mounted device, a Virtual Reality (VR) Headset, an Augmented Reality (AR) Device, a Mixed Reality (MR) Device, a Projection-based System, and/or any other device with computer vision display capabilities. In an embodiment, the system 202 is implemented in the server 212. In another embodiment, the system 202 is implemented in each of the plurality of robots 210. In yet another embodiment, the system 202 is implemented in the one or more user devices 204.

The display screen of the one or more user devices 204 may include suitable logic, circuitry, and interfaces configured to receive the user command. In some embodiments of the disclosure, the display screen is an external display device associated with the one or more user devices 204. The display screen is a touch screen, such as a resistive touch screen, a capacitive touch screen, a thermal touch screen, or any combination thereof. In accordance with an embodiment of the disclosure, the display screen may refer to a display screen of a head-mounted device (HMD), a smart-glass device, a see-through display, a projection-based display, an electro-chromic display, or a transparent display. In some embodiments of the disclosure, the display screen is realized through several known technologies such as, but are not limited to, at least one of a Liquid Crystal Display (LCD) display, a Light Emitting Diode (LED) display, a plasma display, or an Organic LED (OLED) display technology, or other display devices.

The AI model 206 of the system 202 is a computational network or a system of artificial neurons, arranged in a plurality of layers, as nodes. The plurality of layers of the AI model 206 includes an input layer, one or more hidden layers, and an output layer. Each layer of the plurality of layers includes one or more nodes (or artificial neurons). Outputs of all nodes in the input layer are coupled to at least one node of hidden layer(s). Similarly, inputs of each hidden layer are coupled to outputs of at least one node in other layers of the AI model 206. Outputs of each hidden layer are coupled to inputs of at least one node in other layers of the AI model 206. Node(s) in the final layer receive inputs from at least one hidden layer to output a result. The number of layers and the number of nodes in each layer are determined from hyper-parameters of the AI model 206. Such hyper-parameters are set before or while training the AI model 206 on a training dataset.

Each node of the AI model 206 may correspond to a mathematical function (e.g., a sigmoid function or a rectified linear unit) with a set of parameters, tunable during training of the network. The set of parameters includes, for example, a weight parameter, a regularization parameter, and the like. Each node uses the mathematical function to compute an output based on one or more inputs from nodes in other layer(s) (e.g., previous layer(s)) of the AI model 206. All or some of the nodes of the AI model 206 may correspond to the same or a different mathematical function.

In training of the AI model 206, one or more parameters of each node of the AI model 206 are updated based on whether an output of the final layer for a given input (from the training dataset) matches a correct result based on a loss function for the AI model 206. The above process is repeated for the same or a different input until a minima of loss function is achieved, and a training error is minimized. Several methods for training are known in art, for example, gradient descent, stochastic gradient descent, batch gradient descent, gradient boost, meta-heuristics, and the like.

The AI model 206 includes electronic data, such as, for example, a software program, code of the software program, libraries, applications, scripts, or other logic or instructions for execution by a processing device, such as processor set. The AI model 206 includes code and routines configured to enable a computing device, such as the system 202, to perform one or more operations. Additionally, or alternatively, the AI model 206 is implemented using hardware including a processor, a microprocessor (e.g., to perform or control performance of the one or more operations), a field-programmable gate array (FPGA), or an application-specific integrated circuit (ASIC). Alternatively, in some embodiments, the AI model 206 is implemented using a combination of hardware and software. Although in FIG. 2, the AI model 206 is shown to be integrated within the system 202, the disclosure is not so limited and the AI model 206 can be a separate entity from the system 202. In an embodiment, the AI model 206 is stored in the server 212. Examples of the AI model 206 may include, but are not limited to, a deep neural network (DNN), a convolutional neural network (CNN), a CNN-recurrent neural network (CNN-RNN), an artificial neural network (ANN), a fully connected neural network, and/or a combination of such networks.

In an embodiment, each of the internal storage unit 214 and the external storage unit 216 corresponds to an organized collection of data stored which can be accessed electronically from a computer system (such as the system 202). In an embodiment, the internal storage unit 214 is communicatively coupled to the plurality of robots 210. Further, the external storage unit 216 is communicatively coupled to the system 202 via the WAN 104. In an embodiment, the internal storage unit 214 and the external storage unit 216 store one or more robotic parameters associated with each of the plurality of robots 210. Each of the internal storage unit 214 and the external storage unit 216 are designed to manage, store, retrieve, and update data efficiently. The structure of each of the internal storage unit 214 and the external storage unit 216 typically involves tables, records, and fields that can be managed through various database management systems (DBMS). Examples of each of the internal storage unit 214 and the external storage unit 216 unit may include, but are not limited to, as a relational database, a Non-Structured Query Language (SQL) database, a hierarchical database, a network database, a transactional database, a data warehouse, and a distributed database.

In an embodiment of the disclosure, the server 212 is configured to store the AI model 206 on an internal or external storage device.

In an embodiment of the disclosure, the server 212 is implemented as a cloud server and may execute operations through web applications, cloud applications, HTTP requests, repository operations, file transfer, and the like. Other example implementations of the server 212 include, but are not limited to, a database server, a file server, a web server, a media server, an application server, a mainframe server, or a cloud computing server.

In an embodiment of the disclosure, the server 212 is implemented as a plurality of distributed cloud-based resources by use of several technologies that are well known to those ordinarily skilled in the art. A person with ordinary skill in the art will understand that the scope of the disclosure may not be limited to the implementation of the server 212 and the system 202 as two separate entities. In certain embodiments, the functionalities of the server 212 can be incorporated in its entirety or at least partially in the system 202, without a departure from the scope of the disclosure.

Further, the set of sensors 208 captures one or more environmental characteristics associated with the environment. In an embodiment, the set of sensors 208 is communicatively coupled with the system 202 via the WAN 104. As a result, the set of sensors 208 is enabled to transmit the captured one or more environmental characteristics to the system 202 for performing the activity via the integrated set of robots 210A. In an embodiment of the disclosure, the set of sensors 208 may include infrared sensors, ultrasonic sensors, laser sensors, camera sensors, Radio-Frequency Identification (RFID) sensors, accelerometers, and the like.

Further, the plurality of robots 210 are communicatively coupled with the system 202 via the WAN 104. In an embodiment, the plurality of robots 210 are in the environment or in the vicinity of the environment. Further, the system 202 is configured to select the set of robots 210A from the plurality of robots 210 to perform the activity.

In operation, the system 202 is configured to receive a user command to perform the activity within the environment. The system 202 is configured to generate a virtual representation of the environment based on one or more environmental characteristics and the received user command. The system 202 is further configured to compute the target mobility threshold for performing the activity in the environment. The target mobility threshold is computed based on the generated virtual representation and the received user command.

The system 202 is further configured to select the set of robots 210A from the plurality of robots 210 based on the obtained one or more robotic parameters of each of the plurality of robots 210, one or more activity parameters, and the generated virtual representation of the environment. The selected set of robots 210A are capable of completing the activity.

Further, the system 202 is configured to obtain a mobility parameter of each of the plurality of robots 210. The system 202 is further configured to determine the collective mobility of the set of robots 210A from the plurality of robots 210. In an embodiment, the collective mobility of the set of robots 210A is determined using a 3D curve fitting technique. The collective mobility of the set of robots 210A is the combination of the mobility parameter of each robot in the set of robots 210A. The system 202 is configured to determine that the collective mobility of the set of robots satisfies the computed target mobility threshold. The system 202 is further configured to configure the set of robots 210A to integrate in the environment to perform the activity. The integration is performed based on a determination that the collective mobility of the set of robots satisfies the target mobility threshold. The target mobility threshold is indicative of the mobility for performing the activity in the environment based on the one or more environmental characteristics. The system 202 is further configured to configure the set of robots 210A to perform, based on the integration of the set of robots 210A, the activity in the environment.

Figure 3:
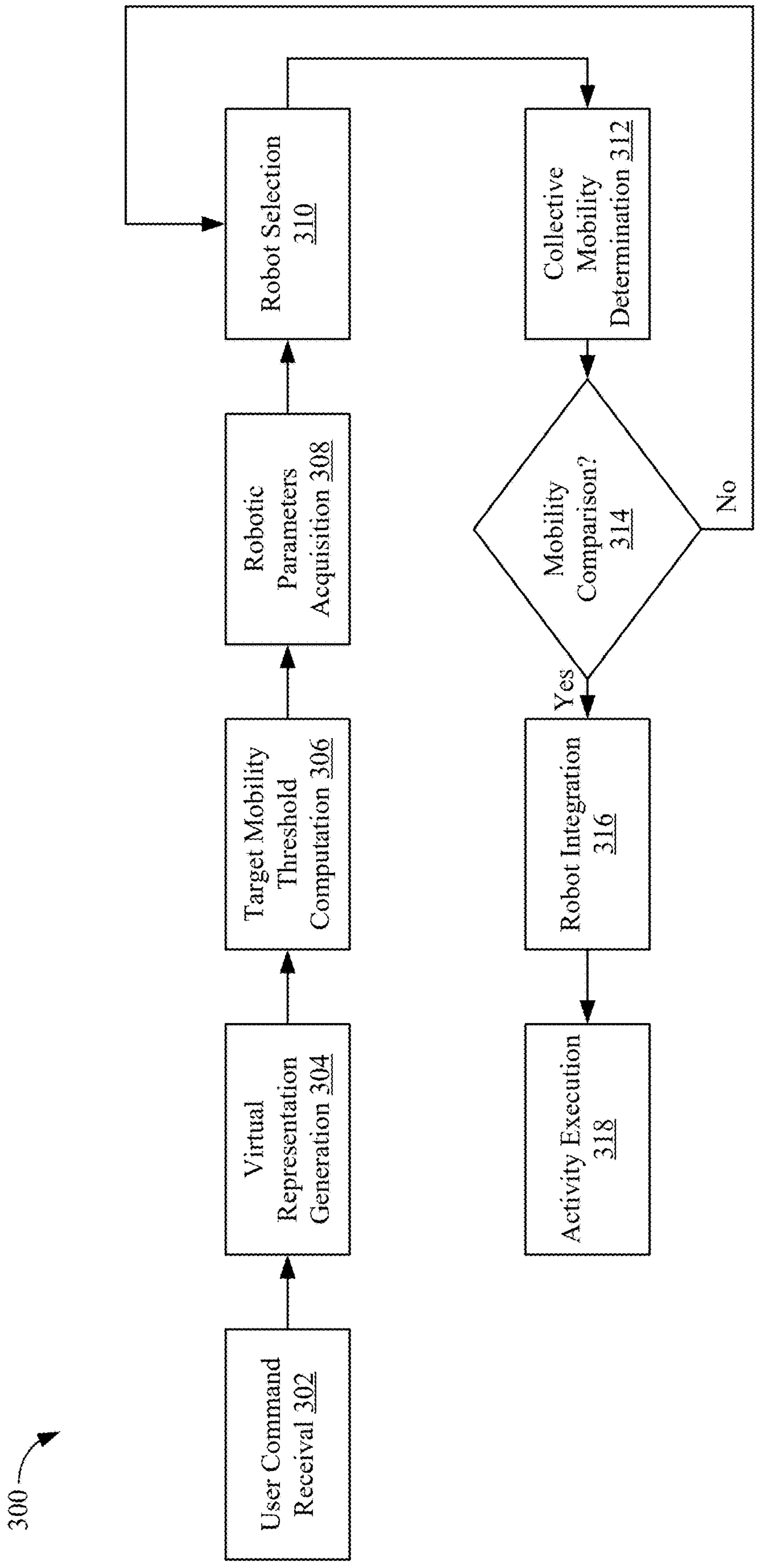
FIG. 3 is a diagram that illustrates exemplary operations for integration of the set of robots to perform the activity, in accordance with an embodiment of the disclosure.

FIG. 3 is a diagram that illustrates exemplary operations for integration of the set of robots 210A to perform an activity, in accordance with an embodiment of the disclosure. FIG. 3 is explained in conjunction with elements from FIG. 1, and FIG. 2. With reference to FIG. 3, there is shown a block diagram 300 that illustrates exemplary operations from 302 to 318, as described herein. The exemplary operations illustrated in the block diagram 300 starts at 302 and are performed by any computing system, apparatus, or device, such as by the computer 102 of FIG. 1 or system 202 of FIG. 2. Although illustrated with discrete blocks, the exemplary operations associated with one or more blocks of the block diagram 300 is divided into additional blocks, combined into fewer blocks, or eliminated, depending on the particular implementation.

At 302, a user command reception operation is executed. In the user command reception operation, the system 202 is configured to receive the user command. In an embodiment, the user command is received by the one or more user devices 204 to perform the activity within the environment. For example, the user command is a command for welding a broken platform.

At 304, a virtual representation generation operation is executed. In the virtual representation generation operation, the system 202 is configured to generate the virtual representation of the environment. In an embodiment, the virtual representation of the environment is generated based on the one or more environmental characteristics and the received user command. The virtual representation is a digital twin of the environment generated using the user command and the one or more environmental characteristics. In the generation of the virtual representation of the environment, the system 202 is configured to obtain the one or more environmental characteristics using the set of sensors 208 installed within the environment or prestored environment knowledge. In an exemplary embodiment, the set of sensors 208 may include infrared sensors, ultrasonic sensors, laser sensors, camera sensors, Radio-Frequency Identification (RFID) sensors, accelerometers, and the like. Further, the prestored environment knowledge corresponds to information about the surroundings or context in which the activity is performed that is programmed or stored in a robot system ahead of time. The prestored environment knowledge includes details, such as a location of obstacles, a layout of the environment, and other relevant factors that impact how the activity is executed. In an exemplary embodiment, the one or more environmental characteristics comprise at least one of a location of one or more Region of Interests (ROIs) associated with the activity within the environment, one or more obstacles in the environment, one or more workpieces located in the environment, a specification of the environment, a position or an orientation of each of the plurality of robots 210 in the environment. In an exemplary embodiment, the one or more environmental characteristics include a location of one or more Region of Interests (ROIs) associated with the activity within the environment, one or more obstacles in the environment, one or more workpieces located in the environment, a specification of the environment, a position, an orientation of each of the plurality of robots 210 in the environment, or any combination thereof.

Further, the system 202 is configured to determine one or more activity parameters associated with the activity based on predefined activity information, the received user command and the obtained one or more environmental characteristics. In an exemplary embodiment, the one or more activity parameters include a priority of the activity, a context of the activity, a category, a sub-category of the activity, or any combination thereof. In an embodiment, the category of the activity corresponds to the broader classification or group that the activity falls under. For example, categories include tasks, such as cleaning, cooking, or gardening. Further, the sub-category corresponds to a more specific classification or subset within a category. For instance, within the cleaning category, sub-categories include tasks, such as vacuuming, mopping, or dusting. In an embodiment, the system 202 uses images and Internet of Things (IoT) feeds from the activity surrounding to identify the category and the sub-category of the activity to be performed. The system 202 also receives the manual feed on the category and the sub-category of the activity. Accordingly, the system 202 identifies the areas and the 3D positions around the activity place where the robotic system is required to perform the activity. In an embodiment, the system 202 uses an activity recognition system that processes sensor data captured from the set of sensors 208 to identify the category and sub-category of activity (e.g., welding, cutting, assembling), and further uses machine learning models to classify and understand the context of the activity. Further, the system 202 is configured to generate the virtual representation of the environment based on the obtained one or more environmental characteristics and the determined one or more activity parameters. In an embodiment, the virtual representation corresponds to a digital representation of the environment including a position of one or more obstacles, a position of one or more workpieces, and a position and an orientation of the plurality of robots 210 in the environment. In an embodiment, the system 202 maps the activity points in 3D space based on the specific requirements of the activity. Further, multiple types of sensors and scanning systems are installed in the activity area/environment, such as cameras, Light Detection and Ranging (LIDAR), and proximity sensors, to capture information about the work environment, the one or more obstacles, and the robotic components involved in the activity. Accordingly, the system 202 identifies different points of interest around the activity area where the robots are required to move. In an exemplary embodiment, the system 202 recognizes the one or more obstacles and identifies the collision points. Further, the system 202 uses avoidance algorithms to ensure that the set of robots 210A can navigate around the one or more obstacles and avoid collisions during the movement based on the identified collision points. In an embodiment, the navigation around the one or more obstacles may be a part of the trajectory path to be followed by the set of robots 210A for performing the activity.

At 306, a target mobility threshold computation operation is executed. In the target mobility threshold computation, the system 202 is configured to compute the target mobility threshold for performing the activity in the environment. In an embodiment, the target mobility threshold is computed based on the generated virtual representation and the received user command. By way of example and not limitation, the target mobility threshold is 0.6 for the activity. The target mobility threshold is indicative of the mobility that may be needed for performing the activity in the environment based on the one or more environmental characteristics.

At 308, a robotic parameters acquisition operation is executed. In the robotic parameter acquisition operation, the system 202 is configured to obtain the one or more robotic parameters associated with each of the plurality of robots 210 available in the environment. The system 202 may also obtain the digital twin simulation models including the one or more robotic parameters of each of the plurality of robots 210. In an embodiment, the one or more robotic parameters associated with each of the plurality of robots 210 are obtained from the storage unit. In an embodiment, the one or more robotic parameters include the mobility parameter and one or more additional parameters associated with each of the set of robots 210A. For example, the mobility parameter includes a degree of freedom of each of the plurality of robots 210, a type of movement of the plurality of robots 210, a range of motion and flexibility in joints of each of the plurality of robots 210, an acceleration and deceleration of each of the plurality of robots 210, speed ranges of each of the plurality of robots 210, an agility of each of the plurality of robots 210, or any combination thereof. For example, the system 202 analyzes the impact of speed on the overall efficiency of completing the activity. In an exemplary embodiment, the one or more additional parameters include a dimensional specification of each of the plurality of robots 210, a number and types of joints of each of the plurality of robots 210, a payload capacity of each of the plurality of robots 210, one or more activity constraints, one or more spatial constraints of each of the plurality of robots 210, an external force handling capability of each of the plurality of robots 210, precision and an accuracy of each of the plurality of robots 210 for performing the activity, types of tools attached with each of the plurality of robots 210, a kinematic structure of each of the plurality of robots 210 (i.e., the number of degrees of freedom and the relationship between joints of each of the plurality of robots 210), or any combination thereof. For example, the system 202 may analyze each of the plurality of robots 210 individually to determine the one or more additional parameters, such as the dimensional specification of each of the plurality of robots 210 (i.e., robotic arm's end effector, degree of freedom, arm length, and the like). In another example, the system 202 identifies what types of movements are possible via different rotational joints and linear actuators of the robotic systems based on the identified number of degrees of freedom of the robotic systems. In another example, the system 202 considers factors, such as the payload capacity, the acceleration, and the deceleration capabilities, to understand the dynamic constraints of the set of robots 210A. Accordingly, the system 202 evaluates the ability of the set of robots 210A to manage external forces and disturbances during mobility. In an exemplary embodiment, the system 202 analyzes the end-effectors or tools attached with the set of robots 210A based on the type of activity to be performed. The system 202 further evaluates the types of tools available with the set of robots 210A and the suitability of the types of tools for the specific activity. Further, the system 202 evaluates the precision and accuracy of the end-effectors in performing intricate tasks associated with the activity.

At 310, a robot selection operation is executed. In the robot selection operation, the system 202 is configured to select the set of robots 210A from the plurality of robots 210 for completing the activity based on the obtained one or more robotic parameters of each of the plurality of robots 210, the one or more activity parameters, and the generated virtual representation of the environment. The system 202 also considers multiple other parameters for selecting the robots, such as the type of tool or end-effector to be used, the required precision for performing the activity, the activity trajectory path to be followed by the set of robots 210A for performing the activity, reach of the set of robots 210A, workspace limitations, and any other spatial constraints. For example, the system 202 uses forward kinematics of the plurality of robots 210 to determine the position and an orientation of an end effector based on joint angles of the robotic arm and the robotic arm movements. Further, the position and the orientation of the end effector is used to execute the robot selection operation. In another embodiment of the disclosure, the system 202 performs the kinematics and dynamics analysis of each of the set of robots 210A using the 3D digital twin simulation model to ensure smooth and collision-free movements. Further, the system 202 attempts to enhance trajectories for achieving efficiency, speed, and accuracy required for completing the activity. In an embodiment, the set of robots 210A includes the primary robot and the one or more secondary robots. For example, the plurality of robots 210 may include robot A, robot B, robot C, and robot D. The set of robots 210A e.g., robot A and robot C is selected from the plurality of robots 210 to complete the activity. In an embodiment, the primary robot is the main robot that performs most of the tasks required to complete the activity. The primary robot is more specialized and has specific capabilities that make the primary robot well-suited for the activity. Further, the one or more secondary robots are supplementary robots used to support the primary robot in completing the activity. The one or more secondary robots have different capabilities or functions that complement the primary robot's abilities, or the one or more secondary robots are used to perform specific tasks that the primary robot is not able to perform on its own. The primary robot and the one or more secondary robots work in tandem to complete the activity efficiently and effectively by integrating with each other in the environment and performing the activity in the environment upon integration.

In the selection of the set of robots 210A from the plurality of robots 210, the system 202 is configured to select the primary robot from the plurality of robots 210 qualified for completing the activity based on the one or more robotic parameters of each of the plurality of robots 210, the one or more activity parameters, the target mobility threshold, and the generated virtual representation of the environment. Further, the system 202 is configured to determine that the selected primary robot is incapable of performing the activity in the environment by comparing the one or more robotic parameters of the primary robot with the target mobility threshold. The system 202 is further configured to select the one or more secondary robots from the plurality of robots 210 to be integrated with the primary robot based on the determination that the selected primary robot is incapable of performing the activity in the environment. In an embodiment, the one or more secondary robots are determined by correlating the one or more robotic parameters of each of the plurality of robots 210, the one or more activity parameters, the target mobility threshold, the generated virtual representation of the environment, and integration feasibility of the primary robot and the one or more secondary robots to perform the activity.

At 312, a collective mobility determination operation is executed. In the collective mobility determination operation, the system 202 is configured to determine the collective mobility of the set of robots 210A from the plurality of robots 210. In an embodiment, the collective mobility of the set of robots 210A is a combination of the mobility parameter of each robot in the set of robots 210A. For example, when the set of robots 210A may include a pair of robots, the collective mobility of the set of robots 210A is determined by the combining the mobility parameter of each robot in the pair of robots.

In the determination of the collective mobility of the set of robots 210A, the system 202 is configured to generate a set of point clouds associated with the obtained mobility parameter for each of the set of robots 210A. In an embodiment, the mobility parameter may correspond to the ability of each of the set of robots 210A to move and navigate in the environment to perform the activity. Further, the set of point clouds may correspond to data points representing reachable positions and orientations of the set of robots 210A in the environment. Further, the system 202 is configured to determine a set of coupling points associated with each of the set of robots 210A based on the generated set of point clouds. Furthermore, the system 202 is configured to merge the generated set of point clouds for each of the set of robots 210A based on the determined set of coupling points. The system 202 is further configured to determine the collective mobility of the set of robots 210A based on a result of the merging of the generated set of point clouds. In an embodiment, the collective mobility of the set of robots 210A is determined using a 3D curve fitting technique. Details on determining the collective mobility are explained with reference to at least FIG. 5, FIG. 6, and FIG. 7.

At 314, a mobility comparison operation is executed. In the mobility comparison operation, it is determined whether the collective mobility is greater than the target mobility threshold. In an embodiment, the target mobility threshold corresponds to the level of mobility or speed that may be needed for the robot to effectively perform the activity in the environment. By way of example and not limitation, the target mobility threshold is 0.5. In case the collective mobility is greater than the target mobility threshold, then the control is transferred to 316. Otherwise, the control is transferred to 310. For example, when the target mobility threshold is 0.5 and the collective mobility is 0.4, the control is transferred to 310 to again perform the robot selection operation. In case the collective mobility is 0.7, the control is transferred to 316 for performing a robot integration operation.

At 316, the robot integration operation is executed. In the robot integration operation, the system 202 is configured to configure the set of robots 210A to perform the activity in the environment. The integration of the set of robots 210A is performed based on the determination collective mobility is greater than the target mobility threshold. In an embodiment, the target mobility threshold is indicative of the mobility that may be needed for performing the activity in the environment based on the one or more environmental characteristics. In the configuration of the set of robots 210A to integrate, the system 202 is configured to validate that the stability of the set of robots 210A satisfies a target stability threshold that may be needed for performing the activity in the environment. The validation is performed using a digital twin simulation technique based on one or more types of forces encountered by the set of robots 210A. The one or more types of forces may include, for example, frictional force, bending force, tolling force, applied torque, contact force, magnetic force, electrical force, and the like.

Further, the system 202 is configured to determine a type of integration to be performed between the set of robots 210A based on the target mobility threshold, the collective mobility of the set of robots 210A and the one or more environmental characteristics. In an exemplary embodiment, the type of integration is determined based on validating that the stability of the integrated set of robots 210A is satisfying the target stability threshold. In an embodiment, the type of integration corresponds to a flexible coupling or a rigid coupling. For example, the type of flexible coupling may be perfect alignment, parallel misalignment, angular and offset (parallel) misalignment, axial position change, and the like. Further, the system 202 is configured to configure the set of robots 210A to integrate in the environment for performing the activity based on the type of integration. For example, the system 202 identifies the 3D position change of the robotic system for performing the activity and creates a volumetric model of the movement pattern of the robotic systems based on the identified position of the robotic systems (i.e., end effectors) and rigid and non-rigid coupling points. The system 202 receives the capability for different types of coupling joints i.e., rigid coupling or non-rigid coupling. For non-rigid coupling, the system 202 identifies the movement range and allows deviation of the movement for diverse types of coupling. Based on the identified allowed ranges of movement of the non-rigid coupling, the system 202 extrapolates the direction of misalignment and capability of the rigid coupling for generating volumetric model of the movement range. Details on the ranges of flexible/non-rigid coupling have been explained with reference to, for example, FIG. 8.

In an embodiment, the system 202 establishes the communication and control interfaces between the simulated set of robots 210A. Once the set of robots 210A is integrated, the system 202 establishes a collaboration between the set of robots 210A. During simulation, the system 202 identifies how the individual movements of each set of robots contribute to the overall resultant movement. In an embodiment, the system 202 establishes a communication protocol for seamless integration between the set of robots 210A. The system 202 also has a universal mechanical interface that allows the primary robot to be dynamically integrated onto diverse types of the one or more secondary robots. In an embodiment, the system 202 simulates the individual movements of the set of robots 210A based on the defined control algorithms. As a result, it may be verified that each robot can move independently in accordance with its kinematic capabilities. Based on the integrated movement, the system 202 simulates the resultant movement when the primary robot is integrated with the one or more secondary robots. The system 202 also validates whether the combined movements of the integrated set of robots 210A align with specifications for a trajectory and mobility for the activity. The system 202 also simulates collaborative movement of the set of robots, ensuring that both the primary robot and the one or more secondary robots work together to provide the specified mobility. Accordingly, the primary robot and the one or more secondary robots perform real-time adjustments to movement patterns based on the progress of the activity and the environment. During simulation, the system 202 makes uniform dimensions and measures each curve in 3D plane to create point cloud of each of the individual curve in 3D space. In an embodiment, the curve may be derived from the degree of freedom and the movement of each of the set of robots.

At 318, an activity execution operation is executed. In the activity execution operation, the system 202 is configured to perform, based on the integration of the set of robots 210A, the activity in the environment. In an embodiment, the set of robots 210A is qualified to perform the activity in the environment. For example, the system 202 considers specified joint angles of set of robots 210A to determine how the end effector/robotic arm/robot can reach specific point in a 3D space for performing the activity. For example, the system 202 performs geometric analysis of the robotic arm to understand the reachable workspace of the robotic arm based on the degree of freedom, the arm length, and the robotic joint specification of the robotic arm. In another example, the system 202 calculates the force/torque required to adjust the robotic arms for performing the activity in the environment based on the specification of the robotic arms and sensor feeds received from the set of sensors 208. The system 202 also compares calculated force/torque with the actual capacity of the robotic arms to determine if the activity can be performed via the robotic arms. In another example, the system 202 identifies different position (x, y, z coordinates) and the orientation (angle) of the end effector required for performing the activity based on the specification of the set of robots 210A and the simulation of the movement of the set of robots 210A. In an embodiment, the system 202 creates a trajectory in a 3D path for the integrated set of robots 210A to be followed based on the one or more activity parameters, and different key points on the activity area. The system 202 uses the created trajectory in the 3D path for performing the activity.

In an embodiment, the system 202 also evaluates the accuracy, speed, and coordination of the resultant movement of the integrated set of robots 210A while performing the activity. Accordingly, the system 202 determines how well the simulated set of robots 210A achieves the desired trajectory for completing the activity. During integrated movement simulation, the system 202 conducts iterative simulations to fine-tune control parameters and collaboration logic. The system 202 also enhances the simulation to improve the efficiency and effectiveness of the resultant movement.

In an embodiment, the system 202 is configured to segment the activity into a set of sub-activities based on the generated virtual representation of the environment. For example, the activity is to assemble a product and the set of sub-activities may be picking up individual parts, positioning them correctly, fastening parts together, and checking for quality control. Further, the system 202 is configured to allocate a corresponding sub-activity from the segmented set of sub-activities to one or more robots from the set of robots 210A for performing the corresponding sub-activity. In an embodiment, the corresponding sub-activity is allocated based on the generated virtual representation of the environment, the one or more robotic parameters associated with each of the set of robots 210A, the target mobility threshold and the integration feasibility of the set of robots 210A to perform the activity. For example, the system 202 may segment the activity based on the target mobility threshold and the collective mobility. Further, the system 202 may assign an appropriate pair of first and second robotic systems to perform different segments of the activity. In an embodiment, the system 202 creates a workflow of execution of different steps of the activity based on the types of mobility in the 3D space for executing the activity and the collective mobility simulation. As a result, the required number (or near required number) of changes may be performed in the coupling of robots to perform the activity.

Further, the system 202 is configured to obtain a set of inputs associated with the set of robots 210A from the set of sensors 208 while the set of robots 210A are performing the activity in the environment. For example, the set of inputs is speed, images of the set of robots 210A, and the like. The system 202 is configured to determine that the set of robots 210A failed to perform the activity in the environment based on the obtained set of inputs. Furthermore, the system 202 is configured to select at least one robot from the plurality of robots 210 based on the determination that the set of robots 210A failed to perform the activity in the environment. In an embodiment, the at least one robot is selected based on the target mobility threshold, one or more robotic parameters, and the one or more environmental characteristics. The system 202 is further configured to integrate the selected at least one robot with each other. Furthermore, the system 202 is configured to configure the selected at least one robot to perform the activity in the environment based on integration of the selected at least one robot. In an embodiment, the integration of the selected at least one robot is performed based on the target mobility threshold, the collective mobility of the at least one robot, the one or more robotic parameters, and the one or more environmental characteristics.

In another embodiment, the system 202 is configured to obtain the mobility parameter of the primary robot. The system 202 is configured to determine that the obtained mobility parameter of the primary robot failed to satisfy the target mobility threshold. Further, the system 202 is configured to determine the collective mobility of the primary robot and one or more secondary robots from the plurality of robots 210 using the AI model 206. In an embodiment, the collective mobility of the primary robot and the one or more secondary robots is a combination of the mobility parameter of the primary robot and the mobility parameter of the one or more secondary robots. In an exemplary embodiment, the mobility parameter includes the degree of freedom of the set of robots 210A, the type of movement of the set of robots 210A, the range of motion and flexibility in each of the joints of the set of robots 210A, the acceleration and the deceleration of the set of robots 210A, the speed ranges of the set of robots 210A, the agility of the set of robots 210A, or any combination thereof. For example, the system 202 evaluates the range of motion and the flexibility in each joint of the set of robots 210A to understand the overall kinematic capabilities of the set of robots 210A. The system 202 also performs dynamic analysis to evaluate the dynamic behavior of the set of robots 210A during movement of the set of robots 210A. Further, the system 202 is configured to determine that the collective mobility of the set of robots satisfies the target mobility threshold. Details on determining the collective mobility have been explained with reference to at least FIG. 9 and FIG. 10.

The system 202 is also configured to select the one or more secondary robots to perform the activity based on the determination that the collective mobility satisfies the target mobility threshold. In the selection of the one or more secondary robots, the system 202 is configured to select, based on the determination that the obtained mobility parameter of the primary robot failed to satisfy the target mobility threshold, the one or more secondary robots from the plurality of robots 210 to be integrated with the primary robot for performing the activity in the environment. In an embodiment, the one or more secondary robots are selected based on one or more robotic parameters of each of the plurality of robots 210, one or more activity parameters, the target mobility threshold, the virtual representation of the environment, and the integration feasibility of the primary robot and the one or more secondary robots to perform the activity. In an embodiment, the target mobility threshold is indicative of a mobility for performing the activity in the environment based on the one or more environmental characteristics. In an exemplary embodiment, the one or more environmental characteristics may include the location of one or more ROIs associated with the activity within the environment, the one or more obstacles in the environment, the one or more workpieces located in the environment, the specification of the environment, the position, the orientation of each of the plurality of robots 210 in the environment, or any combination thereof. Further, the one or more secondary robots are selected for enabling the primary robot to perform the activity in the environment.

Further, system 202 is configured to configure the primary robot and the selected one or more secondary robots to integrate in the environment. The system 202 is also configured to configure the primary robot and the selected one or more secondary robots to perform, based on the integration of the primary robot and the one or more secondary robots, the activity in the environment.

In an exemplary use-case scenario, the user command is to weld two iron beams at a point C. The visual representation is generated for the two iron beams for which the activity of welding is to be performed. The plurality of robots 210 may include five robots from robot 1 to robot 5. Further, the target mobility threshold is computed for the activity. By way of example and not limitation, the target mobility threshold is 0.7. The one or more robotic parameters are acquired for the plurality of robots 210 (for example, the mobility parameter of the plurality of robots 210 is acquired). The set of robots 210A is selected from the plurality of the robots to determine the collective mobility of the set of robots 210A. The collective mobility of the set of robots 210A is determined and compared with the target mobility. In case the collective mobility of the set of robots 210A is not greater than the target mobility threshold, the selection of the set of robots 210A is re-performed and a new set of robots is selected from the plurality of robots 210. Alternatively, if the collective mobility of the set of robots 210A is greater than the target mobility threshold, then the set of robots 210A is integrated. By way of example and not limitation, robot 1 and robot 5 are selected for robot integration. Robot 1 has an independent movement from point A to point B, and robot 5 has an independent movement from point B to point C. In case robot 1 and robot 5 are integrated at point A, the integration of the robot 1 and the robot 5 is used to perform the activity.

Figure 4:
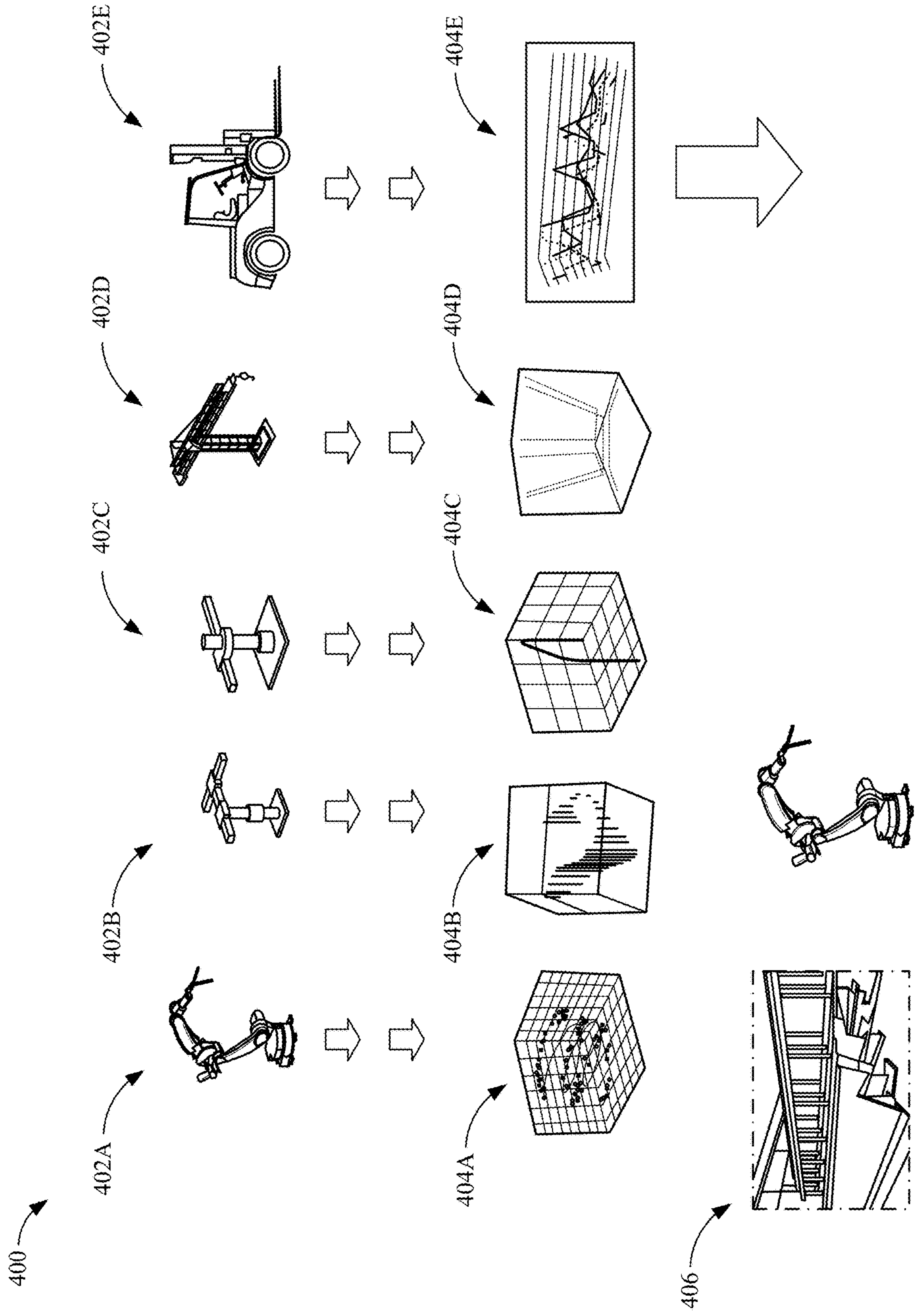
FIG. 4 is a schematic representation depicting an exemplary integration of robots to perform the activity, in accordance with an embodiment in the disclosure.
Figure 4:
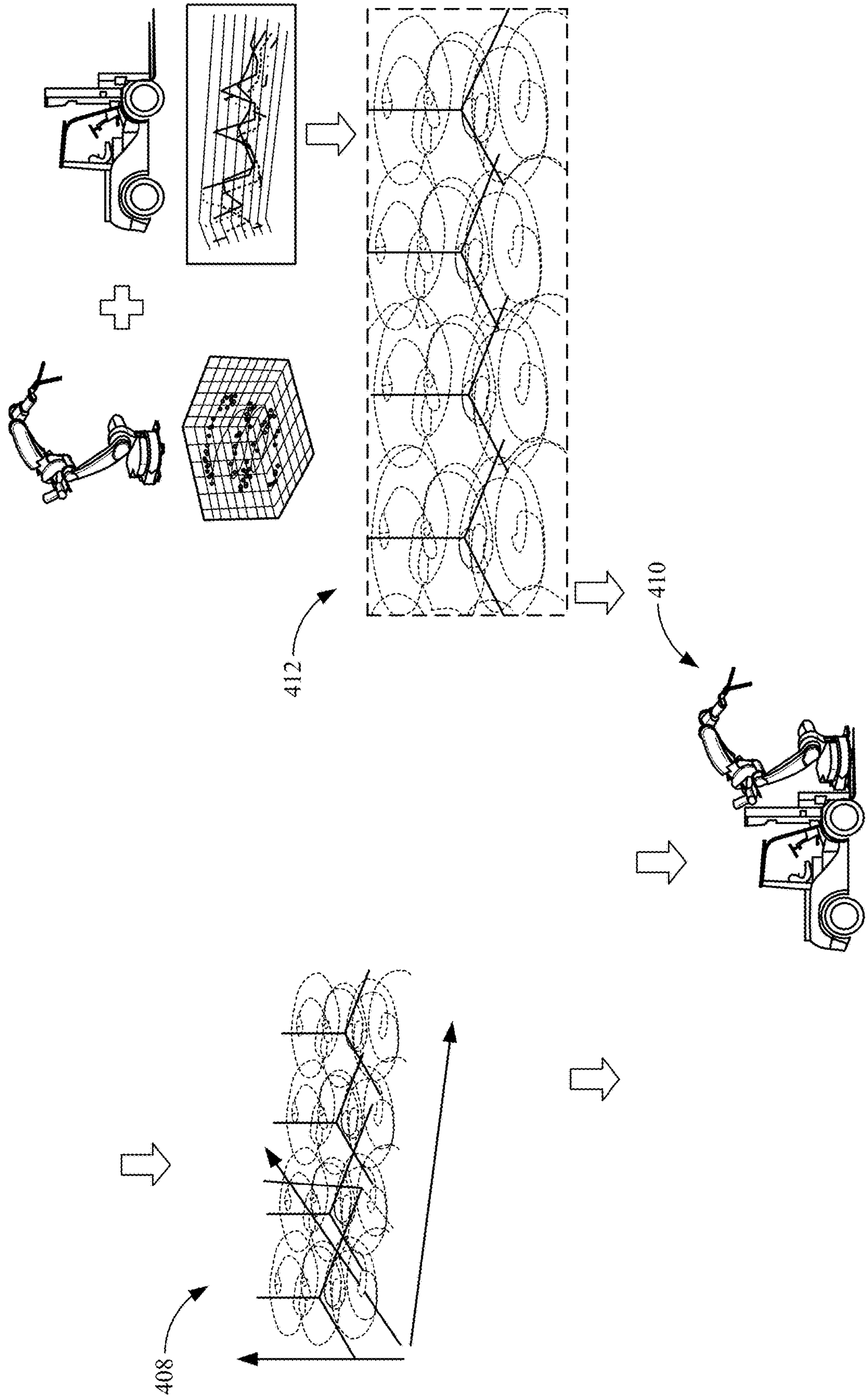

FIG. 4 is a schematic representation depicting an exemplary integration of robots to perform the activity, in accordance with an embodiment in the disclosure. FIG. 4 is explained in conjunction with elements from FIG. 1, FIG. 2, and FIG. 3. With reference to FIG. 4, there is shown an exemplary diagram 400 including a first robot 402A, a second robot 402B, a third robot 402C, a fourth robot 402D, and a fifth robot 402E, a first trajectory graph 404A, a second 404B trajectory graph, a third trajectory graph 404C, a fourth trajectory graph 404D, and a fifth trajectory graph 404E, a platform 406 on which the activity is required to be performed, a target trajectory graph 408, an integrated set of robots 410, and a resultant trajectory graph 412 of the integrated set of robots 410. The first robot 402A, the second robot 402B, the third robot 402C, the fourth robot 402D, and the fifth robot 402E are hereinafter be called as the plurality of robots 402. Further, the first trajectory graph 404A, the second 404B trajectory graph, the third trajectory graph 404C, the fourth trajectory graph 404D, and the fifth trajectory graph 404E are hereinafter be called as the set of trajectory graphs 404.

The plurality of robots 402 corresponds to robotic systems available in the environment having diverse types of mobility capability. As shown, the system 202 determines the locus of the mobility capability associated with each of the plurality of robots 402 for performing the robot integration. Further, the system 202 determines the primary robot for performing the activity based on the locus of the mobility capability and the target mobility threshold. In the current scenario, the primary robot is the robotic arm i.e., the first robot 402A. Further, a specific type of mobility specifies the robotic arm to perform the activity of welding on the platform.

Further, the set of trajectory graphs 404 is generated for the plurality of robots 402, respectively. For example, the first trajectory graph 404A is generated for the first robot 402A and the fifth trajectory graph 404E is generated for the fifth robot 402E i.e., a forklift. The set of trajectory graphs 404 represents a visual movement of the plurality of robots 402.

Furthermore, the system 202 performs an analysis of the one or more activity parameters associated with the activity of welding. The system 202 also performs an analysis of the one more robotic parameter associated with the robotic arm. Further, the system 202 identifies a locus of the robotic arm (i.e., the target trajectory graph 408) required to perform the activity based on the result of analysis. The target trajectory graph 408 corresponds to the specified mobility of the robotic arm (i.e., the gripper of the robotic arm) to complete the activity. Further, the system 202 determines that the target trajectory graph 408 associated with the robotic arm failed to satisfy the target mobility threshold for performing the activity of welding on the platform 406. Furthermore, the system 202 determines that the robotic arm is insufficient to perform the activity of welding alone and the one or more secondary robots are needed.

Further, the system 202 obtains historical mobility data associated with each of the plurality of robots 402 and collective mobility of the plurality of robots 402. In an embodiment, the historical mobility data correspond to data associated with multiple combinations and specifications of the robotic system, patterns of individual mobility capabilities associated with the robotic systems, and the resulting mobility patterns from multiple integrations between the robotic systems. Further, the system 202 determines the set of robots 210A from the plurality of robots 402 to be used for performing the activity of welding based on the obtained historical mobility data and the obtained collective mobility. In an embodiment, the set of robots 210A is determined from the plurality of robots 402 based on the target mobility threshold. As shown in FIG. 4, the target mobility threshold is shown in the form of a graph called the target trajectory graph 408. The system 202 also performs the simulation of the movement of the set of robots 210A. In an embodiment, the simulation is performed to determine whether the collective mobility of the set of robots 210A satisfies the target mobility threshold. In the current scenario, the set of robots 210A are robotic arm (i.e., primary robot) and the forklift (i.e., a secondary robot). In an embodiment, the system simulates the collective mobility of the robotic arm integrated with the forklift. As shown, the collective mobility is shown in the form of a graph called the resultant trajectory graph 412.

In an embodiment, the system 202 determines that the resultant trajectory graph 412 satisfies the target trajectory graph 408 by comparing the resultant trajectory graph 412 with the target trajectory graph 408. When the resultant trajectory graph 412 fails to satisfy the target trajectory graph 408, the system 202 attempts to enhance trial and error simulation for robotic coupling to re-determine the set of robots 210A that may be needed for performing the activity. Details on the enhancement of the trial-and-error simulation for the robotic coupling have been explained with reference to FIG. 11. Further, the system configures the set of robots 210A to integrate in the environment for performing the activity upon determining that the resultant trajectory graph 412 satisfies the target trajectory graph 408. For example, the integrated set of robots 410 may be the robotic arm i.e., the first robot 402A and the forklift i.e., the fifth robot 402E.

Figure 5:
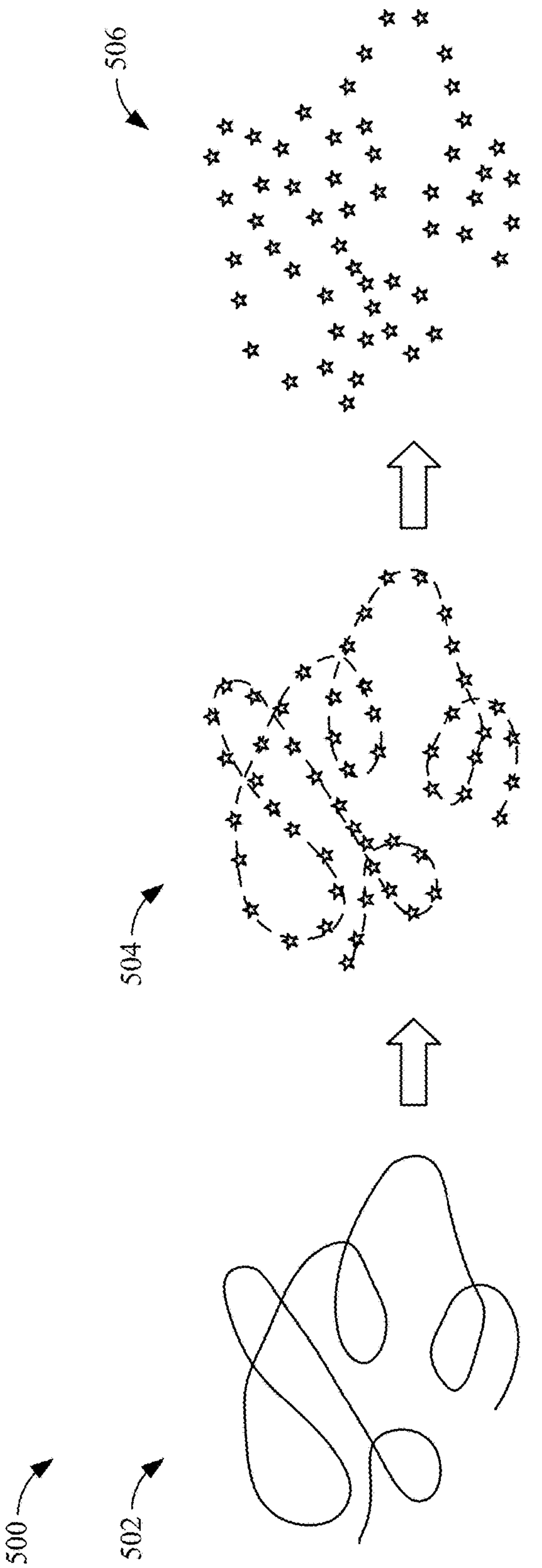
FIG. 5 is a diagram that illustrates the process of generating a set of point clouds associated with a primary robot, in accordance with an embodiment in the disclosure.
Figure 6:
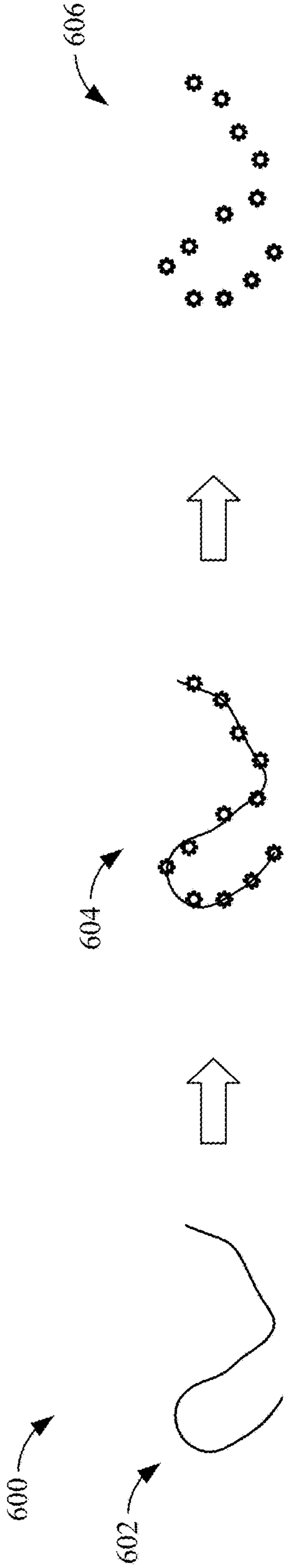
FIG. 6 is a diagram that illustrates the process of generating a set of point clouds associated with a secondary robot, in accordance with an embodiment in the disclosure.
Figure 7:
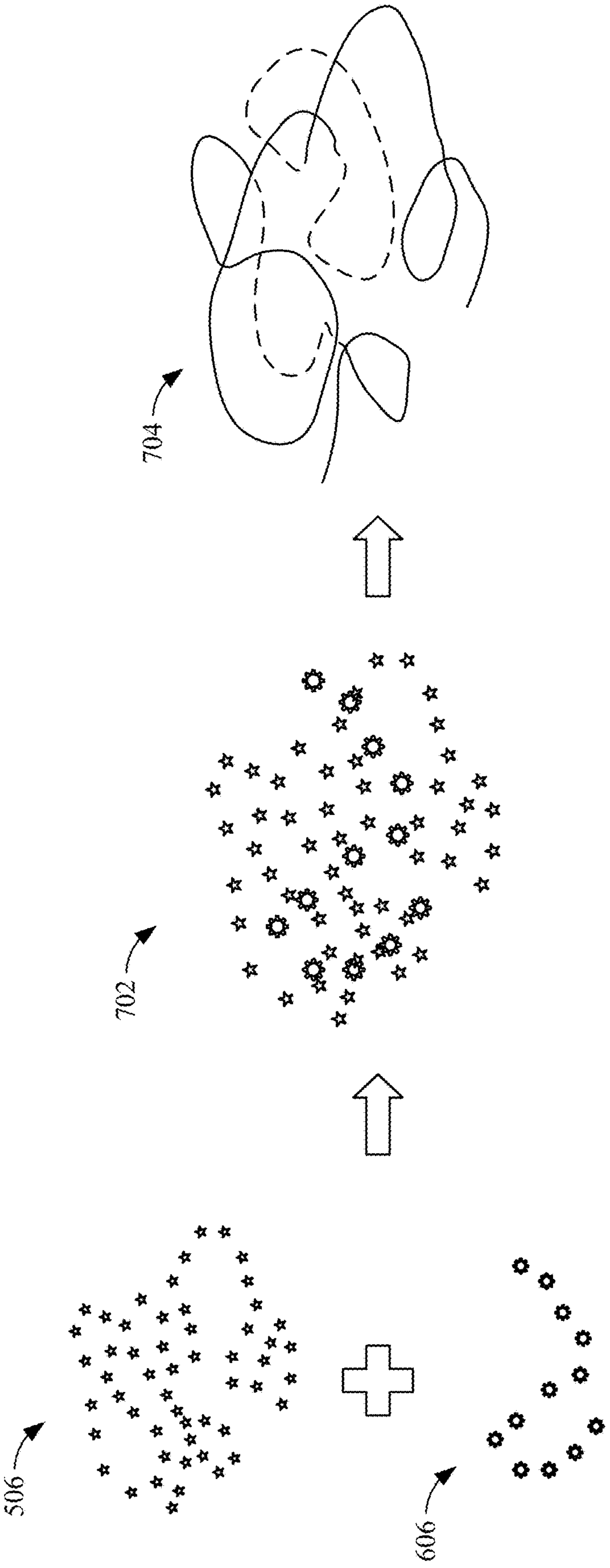
FIG. 7 is a diagram that illustrates the process of determining a collective mobility of the primary robot and the secondary robot, in accordance with an embodiment in the disclosure.

FIG. 5 is a diagram that illustrates the process of generating a set of point clouds associated with a primary robot, in accordance with an embodiment in the disclosure. Further, FIG. 6 is a diagram that illustrates the process of generating a set of point clouds associated with a secondary robot, in accordance with an embodiment in the disclosure. Furthermore, FIG. 7 is a diagram that illustrates the process of determining the collective mobility of the primary robot and the secondary robot, in accordance with an embodiment in the disclosure. For the sake of brevity, FIG. 5, FIG. 6, and FIG. 7 are explained together. FIG. 5, FIG. 6, and FIG. 7 are explained in conjunction with elements from FIG. 1, FIG. 2, FIG. 3, and FIG. 4.

With reference to FIG. 5, an exemplary diagram 500 shows a mobility parameter 502 of the primary robot (i.e., primary robot's movement capability in 3D plane) obtained from the storage unit. Further, the system 202 generates the set of point clouds associated with the obtained mobility parameter. In an embodiment, 504 represents each of the set of point clouds generated on a mobility curve of the primary robot. Further, 506 represents the generated set of point clouds of the mobility curve in 3D space. As shown, the set of point clouds 506 associated with the primary robot is represented using a star symbol.

With reference to FIG. 6, an exemplary diagram 600 shows a mobility parameter 602 of the secondary robot (i.e., secondary robot's movement capability/mobility curve in 3D plane) obtained from the storage unit. Further, the system 202 generates the set of point clouds associated with the obtained mobility parameter. In an embodiment, 604 represents each of the set of point clouds generated on a mobility curve of the secondary robot. Further, 606 represents the generated set of point clouds of the mobility curve in 3D space. As shown, the set of point clouds 606 associated with the secondary robot is represented using a gear symbol.

Further, as shown in FIG. 7 the system 202 determines the set of coupling points associated with each of the primary robot and the secondary robot based on the generated set of point clouds 506, 606. At 702, the system 202 merges the generated set of point clouds 506, 606 for each of the primary robot and the secondary robot. In an embodiment, the system 202 creates the uniform dimension while merging the generated set of point clouds 506, 606. Further, the system 202 determines the collective mobility 704 of the set of robots 210A based on a result of the merging of the generated set of point clouds. In an embodiment, the collective mobility of the set of robots 210A is determined using the 3D curve fitting technique. Further, the system 202 configures the set of robots 210A to integrate in the environment and perform the activity in the environment via the integrated set of robots. The system 202 configures the set of robots 210A to integrate in the environment using the determined collected mobility and the type of integration/coupling. Details on several types of integration/coupling have been explained using at least FIG. 8. Further, details on determining the collective mobility using the types of integration have been explained using at least FIG. 9 and FIG. 10.

Figure 8:
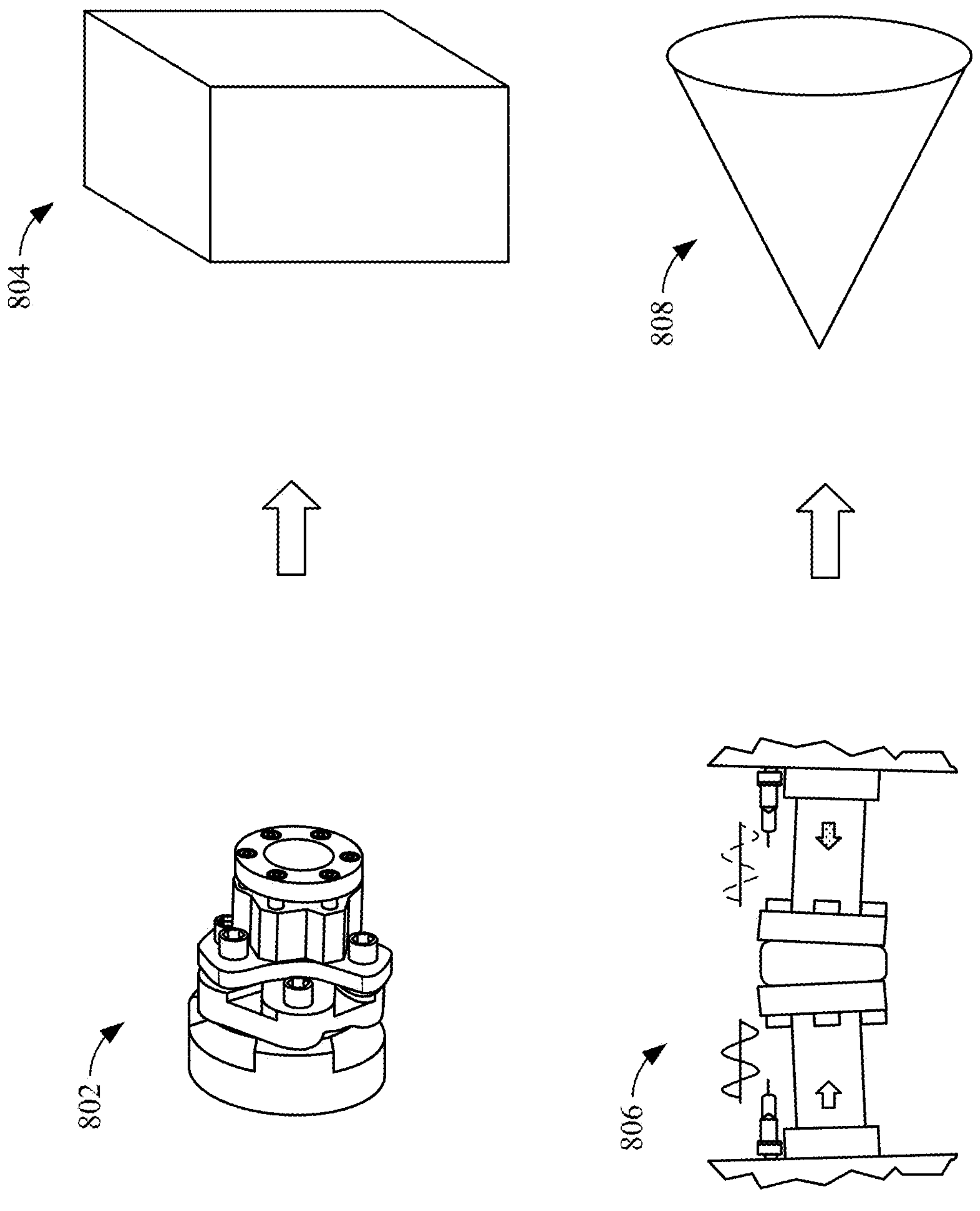
FIG. 8 is a diagram that illustrates ranges of a flexible coupling or a non-rigid coupling, in accordance with an embodiment in the disclosure.

FIG. 8 is a diagram that illustrates ranges of a flexible coupling or a non-rigid coupling, in accordance with an embodiment in the disclosure. FIG. 8 is explained in conjunction with elements from FIG. 1, FIG. 2, FIG. 3, FIG. 4, FIG. 5, FIG. 6, and FIG. 7.

As shown, component 802 represents a first flexible coupling/integration (i.e., non-rigid coupling) associated with the primary robot. Further, block 804 represents a first volumetric movement range of the non-rigid coupling associated with the primary robot. In an embodiment, the first volumetric movement ranges of the non-rigid coupling associated with the primary robot corresponds to the initial or starting range of motion and flexibility allowed by the coupling in connecting the primary robot with the secondary robot. Furthermore, component 806 represents a second flexible coupling/integration (i.e., non-rigid coupling) associated with the secondary robot. Further, block 808 represents a second volumetric movement ranges of the non-rigid coupling associated with the secondary robot. In an embodiment, the second volumetric movement ranges of the non-rigid coupling associated with the secondary robot corresponds to the initial or starting range of motion and flexibility allowed by the coupling in connecting the secondary robot with the primary robot.

During simulation of multiple coupling combinations of the robotic systems (i.e., the primary robot and the one or more secondary robots), either rigid or non-rigid coupling, the system 202 considers multiple combinations of robotic coupling using equation (1).

$$ {}^{n}_{r}C = \frac{n!}{r! * (n-r)!} \text{ where "}n\text{" is the number of robotic systems.} \quad (1) $$

Further, the possible number of simulations associated with the coupling of the robotic systems may be performed considering if a robot can also perform the activity alone using equation (2).

$$ {}^{n}_{1}C + {}^{n}_{2}C + {}^{n}_{3}C + \ldots + {}^{n}_{n}C \quad (2) $$

Furthermore, if multiple robots are required (or may be required) to be coupled for performing the activity, the number of simulations can be performed using equation (3).

$$ {}^{n}_{1}C + {}^{n}_{2}C + {}^{n}_{3}C + \ldots + {}^{n}_{n-1}C \quad (3) $$

Further, if multiple combinations of non-rigid coupling are to be considered and "m" is considered as the number of non-rigid coupling, the combination of flexible/non-rigid coupling can be calculated using equation (4).

$$ {}^{m}_{1}C + {}^{m}_{2}C + {}^{m}_{3}C + \ldots + {}^{m}_{m}C \quad (4) $$

The total number of combinations of the simulation is calculated using equation (5).

$$ \left({}^{m}_{1}C + {}^{m}_{2}C + {}^{m}_{3}C + \ldots + {}^{m}_{m}C\right) * {}^{n}_{1}C + {}^{n}_{2}C + {}^{n}_{3}C + \ldots + {}^{n}_{n}C \quad (5) $$

For each simulation, either rigid coupling (flexible coupling movement is not considered) or non-rigid coupling (where flexible coupling movement is considered), the system 202 identifies how different arm positions and end effectors is positioned on the 3D space. The system 202 also identifies the volumetric movement range based on the type of coupling. The system 202 also considers the individual robotic volumetric movement capability for the end effectors of the coupling points, different combinations of robotic systems, types of coupling, and the collective mobility of the robotic systems for each simulation of coupling combinations of the robotic systems.

In an embodiment, the AI model 206 is created based on the analysis of the individual movement range of a robotic system and a resultant movement range of multiple coupled robotic systems. The AI model 206 obtains simulation data of multiple types of coupling combination and data associated with the physical coupling of the robotic systems. During simulation of a kinematic model of each robotic system, the AI model 206 determines the relationship between joint angles and end-effector position/orientation of each robotic system. The AI model 206 also determines the relationship between joint angles and end-effector position/orientation for the integrated robotic systems.

Further, the AI model 206 is used to determine each robotic system individually which may contribute to perform the activity based on capabilities and purpose of usage of the robotic systems using the digital twin simulation of the robotic systems. Furthermore, the system 202 performs forward kinematics to map joint configurations with end-effector positions for various coupling combinations. As a result, the system 202 determines reachable workspace boundaries based on joint limits, collision avoidance, and other constraints.

The system 202 uses the AI model 206 to identify the range of movement of each of the robotic systems, a type of coupling (rigid coupling or flexible coupling) that may be required for performing the activity, and the collective mobility of the integrated robotic systems. Details about the rigid coupling or the flexible coupling are already known in the art and therefore have been omitted from the disclosure for the sake of brevity. Based on the pattern of individual volumetric movement ranges and the resultant movement range, the system 202 creates the AI model 206. In an exemplary embodiment, the AI model 206 may be a machine learning model, such as Convolutional Neural Network (CNN). Once the mobility associated with the integrated robotic systems is determined for performing the activity, the system 202 uses the AI model 206 to identify multiple combinations of robotic coupling meeting the mobility. Further, the system 202 selects a set of robotic coupling combinations which can achieve the collective mobility for performing the activity. The system 202 also limits the simulation of the set of robotic coupling combinations which can perform the activity. Further, details on determining the collective mobility using the types of integration/coupling have been explained using at least FIG. 9 and FIG. 10. In an embodiment, the AI model 206 may be used for the trial-and-error simulation enhancement to select the robotic coupling combinations which can achieve the collective mobility. Furthermore, details on the selection of robotic coupling combinations have been explained using at least FIG. 11.

Figure 9:
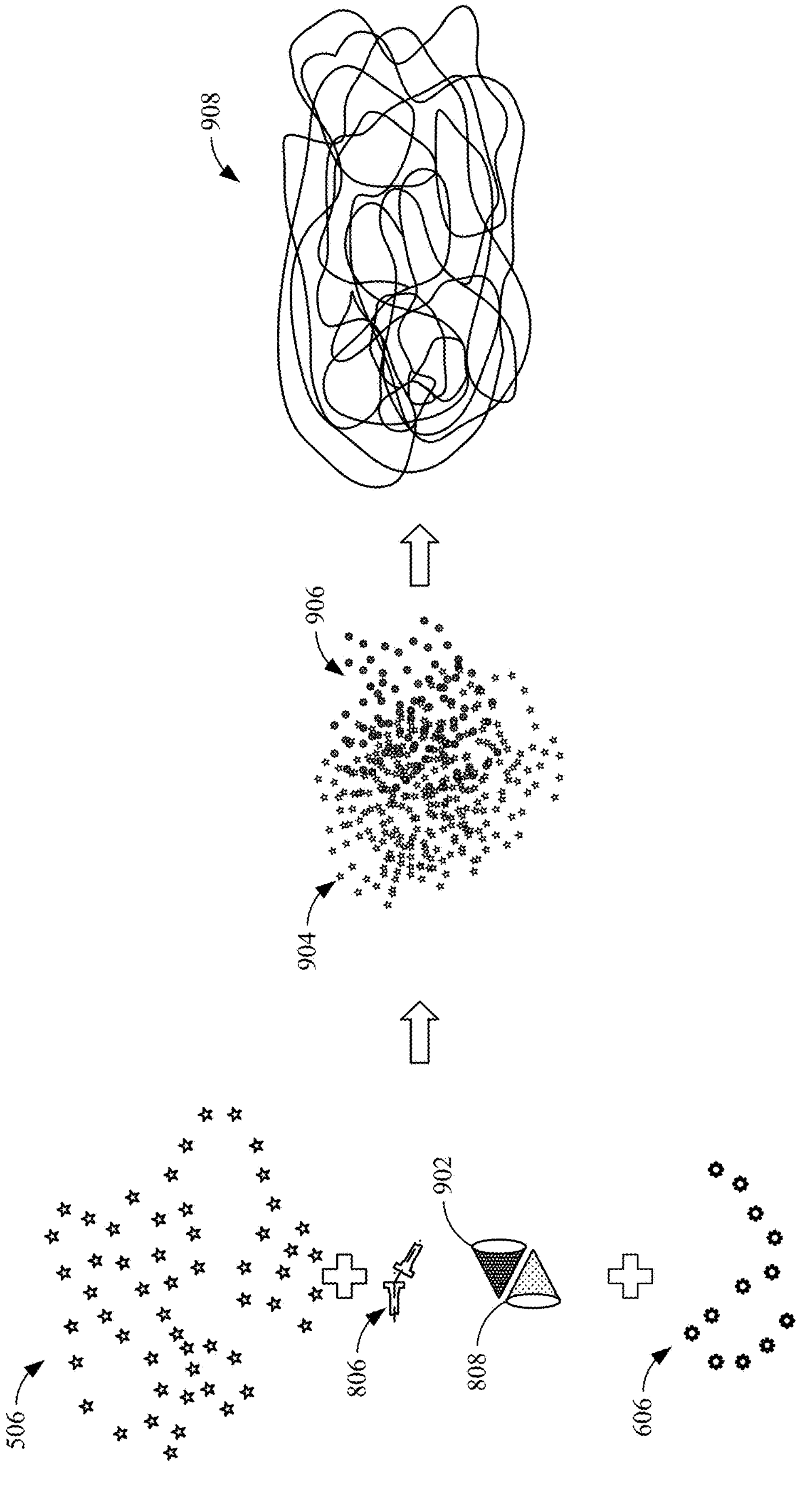
FIG. 9 is a diagram that illustrates the process of determining the collective mobility of the set of robots, in accordance with an embodiment in the disclosure.
Figure 10:
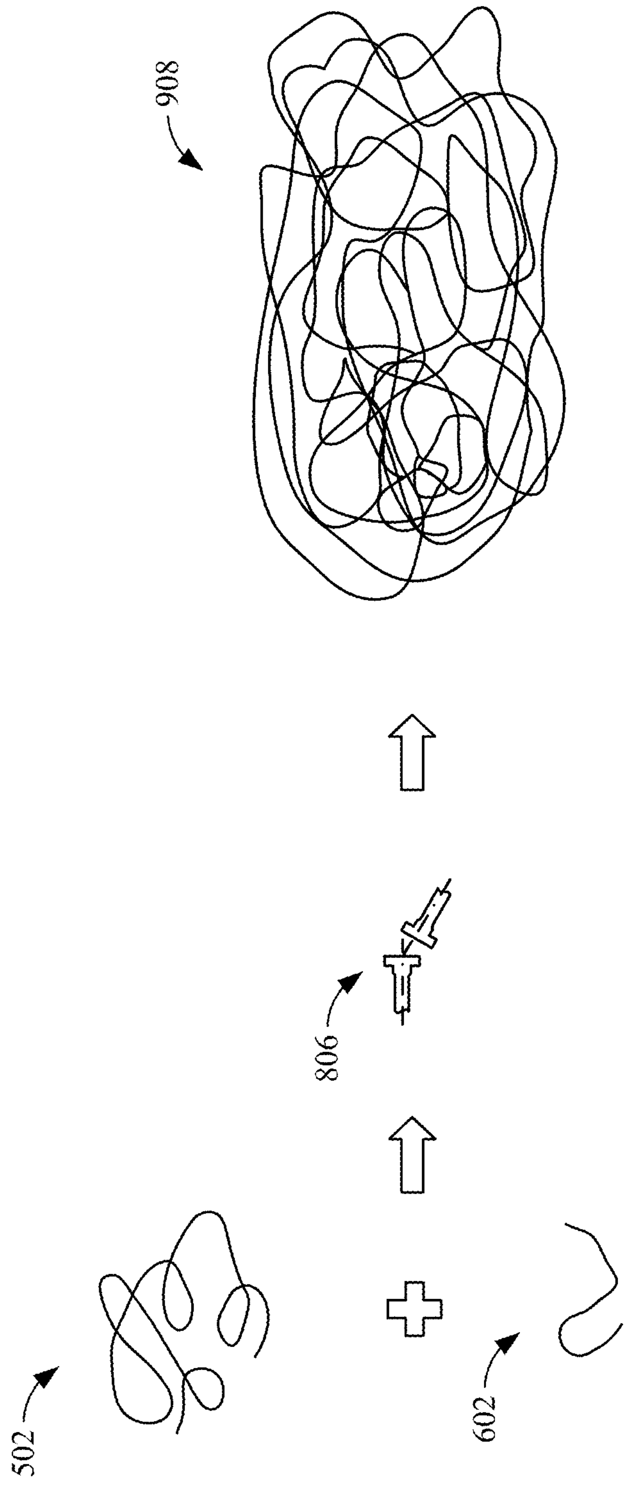
FIG. 10 is a diagram that illustrates the process of determining the collective mobility of the set of robots, in accordance with another embodiment in the disclosure.

FIG. 9 is a diagram that illustrates the process of determining the collective mobility of the set of robots, in accordance with an embodiment in the disclosure. Further, FIG. 10 is a diagram that illustrates the process of determining the collective mobility of the set of robots, in accordance with another embodiment in the disclosure. For the sake of brevity, FIG. 9 and FIG. 10 are explained together. FIG. 9 and FIG. 10 are explained in conjunction with elements from FIG. 1, FIG. 2, FIG. 3, FIG. 4, FIG. 5, FIG. 6, FIG. 7, and FIG. 8.

As shown in FIG. 9, the set of point clouds 506 associated the primary robot and the set of point clouds 606 associated the secondary robots are merged based on the flexible coupling 806 (i.e., the non-rigid coupling), a first volumetric movement range 902 of the primary robot considering that the secondary robot is static (i.e., flexible coupling), and a second volumetric movement range 808 of the secondary robot considering that the primary robot is static (i.e., flexible coupling). In an embodiment, the primary robot is coupled with the secondary robot using flexible coupling. Further, the primary robot and the secondary robot may exhibit movement rages based on the flexible coupling/non-rigid coupling between the primary robot and the secondary robot. Further, star symbols represent extended movement ranges 904 of the primary robot. Furthermore, gear symbols represent extended movement ranges 906 of the secondary robot.

Further, the system 202 performs the digital twin simulation of the integrated primary robot and the secondary robot based on the extended mobility ranges of the primary robot and the secondary robot and relative position of the primary robot and the secondary robot with flexible/rigid coupling. The system 202 validates the movement ranges which are stable by using the digital twin simulation. The system 202 also validates the movement ranges which ensure required power transfer effectiveness of the integrated primary robot and the secondary robot by using the digital twin simulation. Further, the system 202 determines extended collective mobility 908 of the primary robot and the secondary robot using the digital twin simulation.

In an embodiment, the digital twin simulation may consider the capabilities and limitations of several types of flexible/non-rigid coupling mechanisms to connect the primary robot and the second robot based on target mobility threshold. As a result, it is ensured that the target mobility threshold is achieved effectively Further, the primary robot and the second robot can have flexible/non-rigid coupling mechanisms or any external flexible/non-rigid coupling mechanisms that can be considered to couple the primary robot and the second robot.

Furthermore, FIG. 10 explains how the primary robot and the secondary robot may achieve the collective mobility if the primary robot and the secondary robot are connected via the flexible coupling 806. As shown, the mobility parameter 502 of the primary robot (i.e., the primary robot's movement capability in 3D plane) and the mobility parameter 602 of the secondary robot (i.e., secondary robot's movement capability/mobility curve in 3D plane) are merged using the flexible/rigid coupling. As a result, the system determines the extended collective mobility 908 of the primary robot and the secondary robot.

Figure 11:
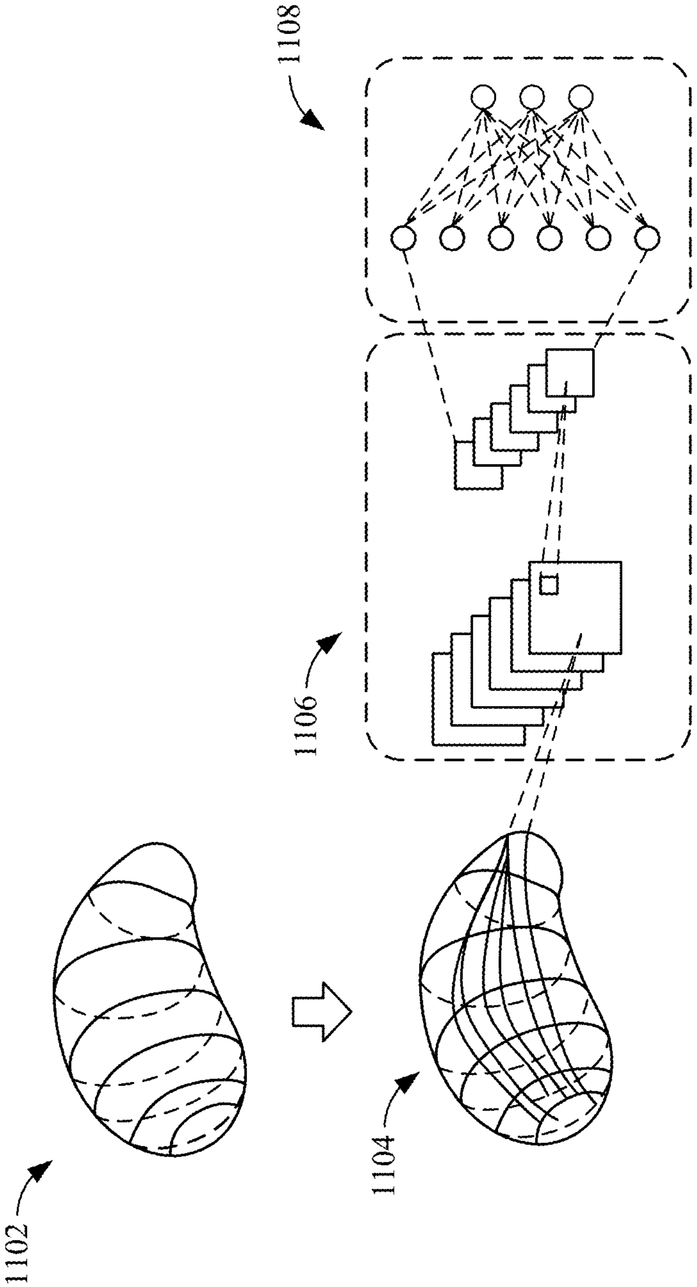
FIG. 11 is a diagram that illustrates the process of selecting the set of robots using an AI model, in accordance with another embodiment in the disclosure.

FIG. 11 is a diagram that illustrates the process of selecting the set of robots 210A using the AI model 206, in accordance with another embodiment in the disclosure. FIG. 11 is explained in conjunction with elements from FIG. 1, FIG. 2, FIG. 3, FIG. 4, FIG. 5, FIG. 6, FIG. 7, FIG. 8, FIG. 9, and FIG. 10.

As shown, 1102 represents the mobility of the primary robot obtained from the storage unit. In an embodiment, the mobility 1102 of the primary robot is not meeting the mobility needed for performing the activity. Further, at step 1104, the system 202 creates a mesh model or a point cloud model of the mobility specifications for performing the activity. At step 1106, the system 202 performs a feature extraction operation using the AI model 206. In the step 1106, the system 202 extracts multiple features from the created mesh model. In an exemplary embodiment of the present disclosure, the extracted multiple features include geometric parameters, spatial parameters, topological parameters (e.g., how different parts of the mesh are connected or how the topology of the mesh is structured), surface parameters, structural parameters, and the like. Furthermore, at step 1108, the system 202 performs a classification operation using the AI model 206 and the extracted multiple features. As a result, the system 202 determined multiple combination sets. In an embodiment, each of the multiple combination sets correspond to a robotic coupling combination which may be used for performing the activity. For example, robot 1 and robot 2 can be coupled in coupling 1. In an embodiment, the system 202 calculates a percentage of successfully performing the activity for each of the robotic coupling combination. Further, the system 202 performs the trial-and-error simulation using the determined multiple combination sets. For example, coupling 1 i.e., integration of robot 1 and robot 2, have the highest percentage (i.e., 80%) for successfully performing the activity.

The AI model 206 is trained using the data stored in the storage unit. In an embodiment, the system 202 obtains the historical mobility data associated with each of the plurality of robots 402 and collective mobility of the plurality of robots 402. The historical mobility data correspond to data associated with multiple combinations and specifications of the robotic system, patterns of individual mobility capabilities associated with the robotic systems, and the resulting mobility patterns from multiple integrations between the robotic systems. Further, the system 202 creates the storage unit (knowledge corpus) for predicting resultant mobility patterns based on the historical mobility data and the one or more robotic parameters. Accordingly, the system 202 enhances the number of trial-and-error combinations for simulation execution and selects appropriate robots to be coupled for performing the activity using the created storage unit.

The present disclosure has multiple advantages. For example, if the primary robot (such as robotic arm) fails to reach the designated activity location or lacks the necessary mobility for the activity, the present disclosure dynamically configures the primary robot to integrate with the one or more secondary robots (such as an industrial vehicle, automated guided vehicle, or crane). To successfully perform the activity, the primary robot and the one or more secondary robots collaborate to achieve specified mobility. Accordingly, the primary robot is enabled to achieve the specified performance at the designated activity location. Further, the present disclosure determines the specified mobility of the primary robot in the 3D space for a given activity based on the activity's specifications and area coverage. If it is determined that the primary robot failed to achieve the specified mobility, the primary robot may determine the suitable one or more secondary robots, such that the individual movement of both the primary robot and the one or more secondary robots can generate the necessary resultant movement of the primary robot. Accordingly, the primary robot is enabled to effectively perform the activity in the environment.

Further, the present disclosure evaluates the types of movements and the speed of movement of the primary robot for performing the activity. The present disclosure further evaluates whether integrating the primary robot with the one or more secondary robots is feasible and whether the integration can enhance the completion rate of the activity by leveraging the resulting movement pattern and increased speed of movement. When the primary robot is integrated with the one or more secondary robots and the integrated primary and the one or more secondary robots can perform individual movements that contribute to the collective mobility, the present disclosure dynamically monitors the activity's progress and location. Subsequently, both the primary robot and the one or more secondary robots independently identify the specific movements for performing the activity, such that collective mobility is achieved.

Furthermore, the present disclosure determines if the primary robot can perform the activity alone based on the specification of the primary robot, the analysis of the activity, the reachability and accessibility of different points within the workspace/environment. When the present disclosure determines that the primary robot failed to achieve the target mobility threshold, the present disclosure simulates the movement pattern with various combination of the one or more secondary robots to identify if the target mobility threshold can be achieved.

While performing the activity and aiming to achieve collective mobility, the present disclosure may obtain multiple secondary robots for different portions of the activities. Depending on collective mobility specifications, the present disclosure enables the first robotic system to integrate with a secondary robot. Upon integration of the first robotic system with the secondary robot, the primary robot may again integrate with another secondary robot for performing the activity. The present disclosure creates detailed 3D models of both the primary robot and the one or more secondary robots, including individual joints, end-effectors, and any tools attached with the primary robot and the one or more secondary robots. The present disclosure also integrates the kinematic models of both the primary robot and the one or more secondary robots into the simulation environment.

Figure 12:
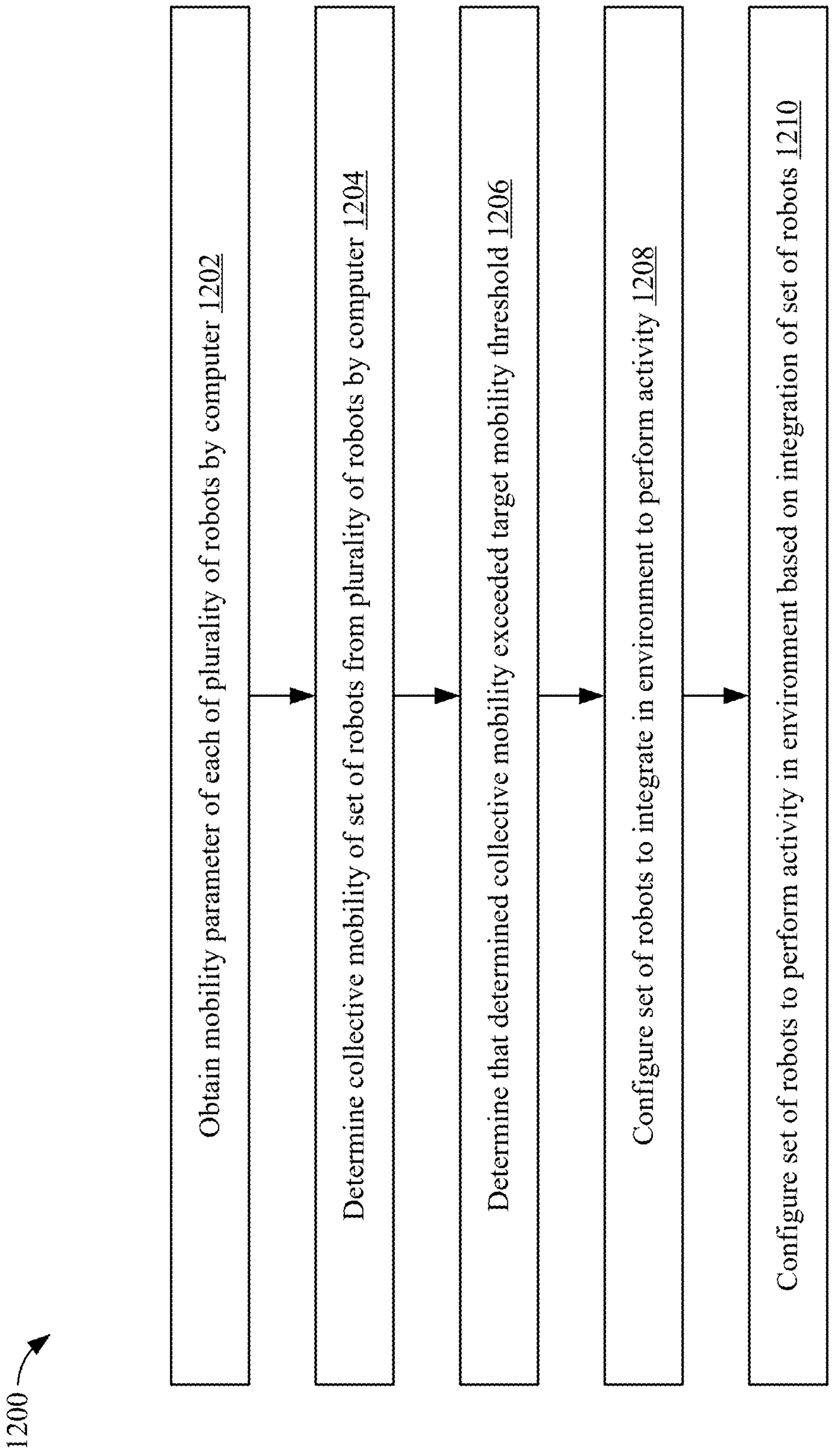
FIG. 12 is a flowchart that illustrates an exemplary first method for integration of the set of robots to perform the activity, in accordance with an embodiment of the disclosure.

FIG. 12 is a flowchart that illustrates an exemplary first method for integration of the set of robots 210A to perform the activity, in accordance with an embodiment of the disclosure. FIG. 12 is explained in conjunction with elements from FIG. 1, FIG. 2, FIG. 3, FIG. 4, FIG. 5, FIG. 6, FIG. 7, FIG. 8, FIG. 9, FIG. 10, and FIG. 11. With reference to FIG. 12, there is shown flowchart 1200. The operations of the exemplary method are executed by any computing system, for example, by the computer 102 of FIG. 1 or the system 202 of FIG. 2. The operations of the flowchart 1200 may start at 1202.

At 1202, a mobility parameter of each of a plurality of robots 210 is obtained. In an embodiment of the disclosure, the system 202 is configured to obtain the mobility parameter of each of the plurality of robots 210. Details about the obtaining of the mobility parameter are provided, for example, in FIG. 3.

At 1204, the collective mobility of a set of robots 210A from the plurality of robots 210 is determined. The collective mobility of the set of robots 210A is a combination of the mobility parameter of each robot in the set of robots 210A. In an embodiment of the disclosure, the system 202 is configured to determine the collective mobility of the set of robots 210A from the plurality of robots 210. Details about the determination of the collective mobility are provided, for example, in FIG. 3, FIG. 7, FIG. 9 and FIG. 10.

At 1206, it is determined that the collective mobility satisfies a target mobility threshold. In an embodiment of the disclosure, the system 202 is configured to determine that the collective mobility of the set of robots satisfies the target mobility threshold. Details about the determination that the collective mobility satisfies the target mobility threshold are provided, for example, in FIG. 3.

At 1208, the set of robots 210A is configured to integrate in an environment to perform an activity. The integration is performed based on determining that the collective mobility satisfies the target mobility threshold. The target mobility threshold is indicative of a mobility that may be needed for performing the activity in the environment based on one or more environmental characteristics. In an embodiment of the disclosure, the system 202 is configured to configure the set of robots 210A to integrate in the environment to perform the activity. Details about the configuration of the set of robots 210A are provided, for example, in FIG. 3.

At 1210, the set of robots 210A is configured to perform, based on the integration of the set of robots 210A, the activity in the environment. In an embodiment of the disclosure, the system 202 is configured to configure the set of robots 210A to perform, based on the integration of the set of robots 210A, the activity in the environment. Details about the configuration of the set of robots 210A are provided, for example, in FIG. 3.

While the above steps shown in FIG. 12 are described in a particular sequence, the steps may occur in variations to the sequence in accordance with various embodiments of the present disclosure. Further, details related to various steps of FIG. 12, which are already covered in the description related to FIG. 1 to FIG. 11 are not discussed again in detail here for the sake of brevity.

Figure 13:
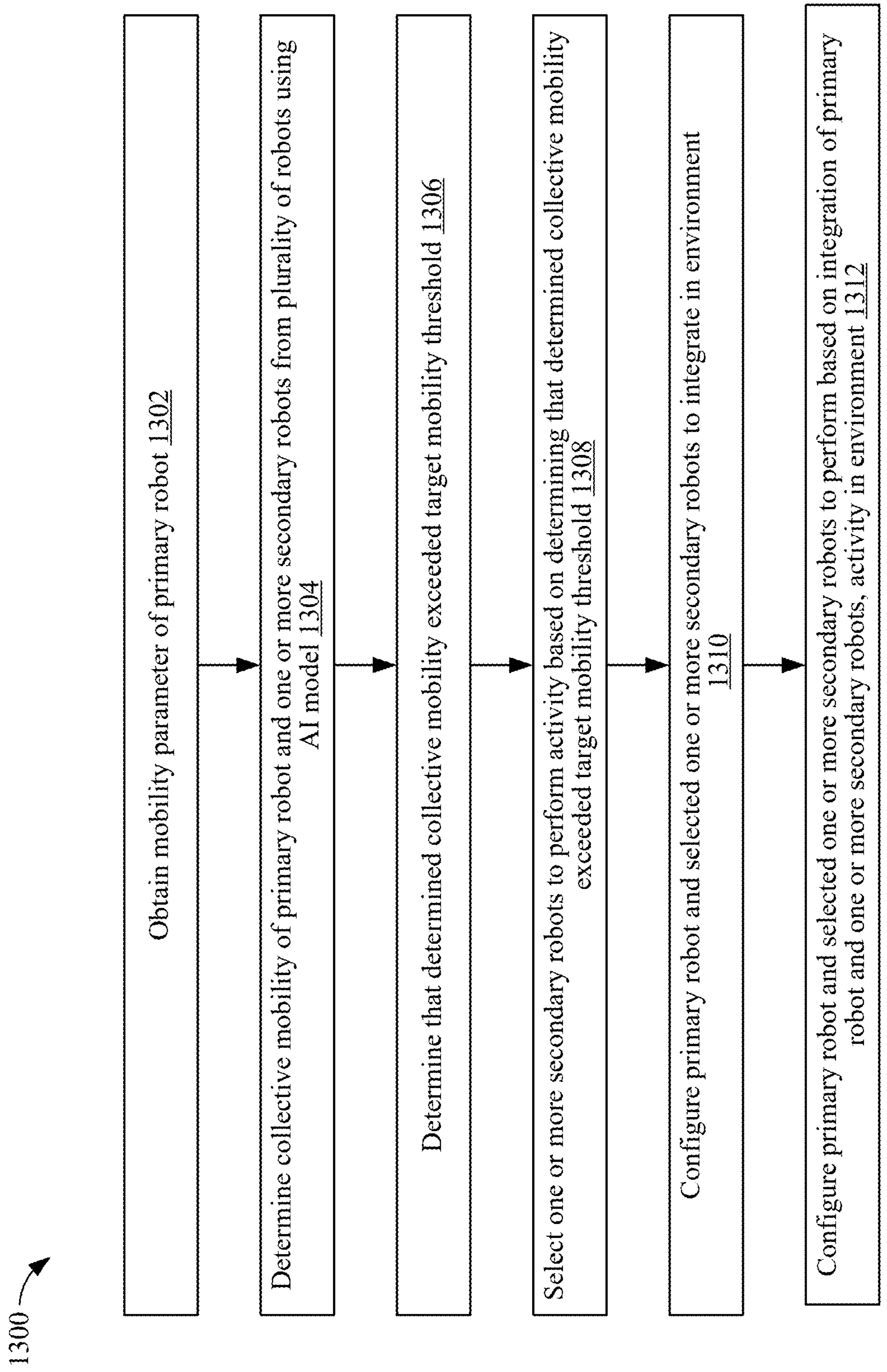
FIG. 13 is a flowchart that illustrates an exemplary second method for integration of the set of robots to perform the activity, in accordance with another embodiment of the disclosure.

FIG. 13 is a flowchart that illustrates an exemplary second method for integration of the set of robots 210A to perform the activity, in accordance with another embodiment of the disclosure. FIG. 13 is explained in conjunction with elements from FIG. 1, FIG. 2, FIG. 3, FIG. 4, FIG. 5, FIG. 6, FIG. 7, FIG. 8, FIG. 9, FIG. 10, FIG. 11, and FIG. 12. With reference to FIG. 13, there is shown flowchart 1300. The operations of the exemplary method are executed by any computing system, for example, by the computer 102 of FIG. 1 or the system 202 of FIG. 2. The operations of the flowchart 1300 may start at 1302.

At 1302, the mobility parameter of a primary robot is obtained. In an embodiment of the disclosure, the system 202 is configured to obtain the mobility parameter of the primary robot. Details about obtaining the mobility parameter are provided, for example, in FIG. 3.

At 1304, the collective mobility of the primary robot and one or more secondary robots from the plurality of robots 210 is obtained using the AI model 206. In an embodiment, the collective mobility of the primary robot and the one or more secondary robots is a combination of the mobility parameter of the primary robot and the mobility parameter of the one or more secondary robots. In an embodiment of the disclosure, the system 202 is configured to determine the collective mobility of the primary robot and the one or more secondary robots from the plurality of robots 210 using the AI model 206. Details about the determination of the collective mobility have been explained with reference to at least FIG. 3, FIG. 7, FIG. 9, and FIG. 10.

At 1306, it is determined that the collective mobility satisfies the target mobility threshold. In an embodiment of the disclosure, the system 202 is configured to determine that the collective mobility of the set of robots may satisfy the target mobility threshold. Details about the determination that the collective mobility satisfies the target mobility threshold are provided, for example, in FIG. 3.

At 1308, the one or more secondary robots are selected to perform the activity based on a determination that the collective mobility of the set of robots satisfies the target mobility threshold. In an embodiment, the target mobility threshold is indicative of the mobility that may be needed for performing the activity in the environment based on the one or more environmental characteristics. The one or more secondary robots is selected for enabling the primary robot to perform the activity in the environment. In an embodiment of the disclosure, the system 202 is configured to select the one or more secondary robots to perform the activity based on determining that the collective mobility satisfies the target mobility threshold. Details about the selection of the one or more secondary robots are provided, for example, in FIG. 3.

At 1310, the primary robot and the selected one or more secondary robots is configured to integrate in the environment. In an embodiment of the disclosure, the system 202 is configured to configure the primary robot and the selected one or more secondary robots to integrate in the environment. Details about the configuration of the primary robot and the selected one or more secondary robots, for example, in FIG. 3.

At 1312, the primary robot and the selected one or more secondary robots are configured to perform, based on the integration of the primary robot and the one or more secondary robots, the activity in the environment. In an embodiment of the disclosure, the system 202 is configured to configure the primary robot and the selected one or more secondary robots to perform, based on the integration of the primary robot and the one or more secondary robots, the activity in the environment.

While the above steps shown in FIG. 13 are described in a particular sequence, the steps may occur in variations to the sequence in accordance with various embodiments of the present disclosure. Further, details related to various steps of FIG. 13, which are already covered in the description related to FIG. 1 to FIG. 12, are not discussed again in detail here for the sake of brevity.

Various embodiments of the disclosure may provide a non-transitory computer readable medium and/or storage medium having stored thereon, instructions executable by a machine and/or a computer to operate a system (e.g., the system 202) for integration of a set of robots 210A to perform an activity. The instructions cause the machine and/or computer to perform operations that include obtaining a mobility parameter for each of a plurality of robots 210. The operations further include determining a collective mobility of a set of robots 210A from the plurality of robots 210. The collective mobility of the set of robots 210A is a combination of the mobility parameter of each robot in the set of robots 210A. The operations also include determining that the collective mobility of the set of robots satisfies a target mobility threshold. The operations further include configuring the set of robots 210A to integrate in an environment for performing the activity. The integration is performed based on a determination that the collective mobility of the set of robots satisfies the target mobility threshold. The target mobility threshold is indicative of a mobility that may be needed for performing the activity in the environment based on one or more environmental characteristics. The operations further include configuring the set of robots 210A to perform, based on the integration of the set of robots 210A, the activity in the environment.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining, by a computer, a mobility parameter of each robot of a plurality of robots;

determining, by the computer, a collective mobility of a set of robots from the plurality of robots, wherein the collective mobility of the set of robots is a combination of the mobility parameter of each robot in the set of robots;

determining that the collective mobility of the set of robots satisfies a target mobility threshold;

configuring, by the computer, the set of robots to:

integrate in an environment to perform an activity, wherein the integration is performed based on a determination that the collective mobility of the set of robots satisfies the target mobility threshold, wherein the target mobility threshold is indicative of a mobility for performing the activity in the environment based on one or more environmental characteristics, and wherein the configuring of the set of robots to integrate comprises:

validating that a stability of the set of robots satisfies a target stability threshold for the performing of the activity in the environment, wherein the validating is performed using a digital twin simulation technique based on one or more types of forces encountered by the set of robots; and determining a type of integration, to be performed between the set of robots, based on the target mobility threshold, the collective mobility of the set of robots, the one or more environmental characteristics, and the validating that the stability of the set of robots satisfies the target stability threshold, wherein the configuring, by the computer, of the set of robots to integrate in the environment for the performing of the activity, is based on the type of integration; and perform, based on the integration of the set of robots, the activity in the environment.

2. The computer-implemented method of claim 1, further comprising:

receiving, by the computer, a user command to perform the activity within the environment;

generating, by the computer, a virtual representation of the environment based on the one or more environmental characteristics and the received user command; and computing, by the computer, the target mobility threshold for the performing of the activity in the environment, wherein the target mobility threshold is computed based on the generated virtual representation and the received user command.

3. The computer-implemented method of claim 2, wherein the generating of the virtual representation of the environment comprises:

obtaining, by the computer, the one or more environmental characteristics using at least one sensor of a set of sensors installed within the environment or prestored environment knowledge;

determining, by the computer, one or more activity parameters associated with the activity based on predefined activity information, the received user command, and the obtained one or more environmental characteristics; and generating, by the computer, the virtual representation of the environment based on the obtained one or more environmental characteristics and the determined one or more activity parameters, wherein the virtual representation corresponds to a digital representation of the environment comprising a position of one or more obstacles, a position of one or more workpieces, and a position and an orientation of the plurality of robots in the environment.

4. The computer-implemented method of claim 3, further comprising:

segmenting the activity into a set of sub-activities based on the generated virtual representation of the environment; and allocating, by the computer, a corresponding sub-activity from the segmented set of sub-activities to one or more robots from the set of robots for performing the corresponding sub-activity, wherein the corresponding sub-activity is allocated based on the generated virtual representation of the environment, one or more robotic parameters associated with each robot of the set of robots, the target mobility threshold, and an integration feasibility of the set of robots to perform the activity.

5. The computer-implemented method of claim 3, further comprising:

obtaining, by the computer, one or more robotic parameters associated with each robot of the plurality of robots available in the environment from a storage unit; and selecting, by the computer, the set of robots from the plurality of robots qualified for completing the activity, based on the obtained one or more robotic parameters of each robot of the plurality of robots, the one or more activity parameters, and the generated virtual representation of the environment, wherein the set of robots comprises a primary robot and one or more secondary robots.

6. The computer-implemented method of claim 5, wherein the selecting of the set of robots from the plurality of robots comprises:

selecting, by the computer, the primary robot from the plurality of robots qualified for the completing of the activity, based on the one or more robotic parameters of each robot of the plurality of robots, the one or more activity parameters, the target mobility threshold, and the generated virtual representation of the environment;

determining, by the computer, the selected primary robot is incapable of performing the activity in the environment by comparing the one or more robotic parameters of the primary robot with the target mobility threshold; and selecting, by the computer, the one or more secondary robots from the plurality of robots to be integrated with the primary robot, based on the determining that the selected primary robot is incapable of performing the activity in the environment, wherein the one or more secondary robots are determined by correlating the one or more robotic parameters of each robot of the plurality of robots, the one or more activity parameters, the target mobility threshold, the generated virtual representation of the environment, and integration feasibility of the primary robot and the one or more secondary robots to perform the activity.

7. The computer-implemented method of claim 6, wherein the one or more activity parameters comprise at least one of a priority of the activity, a context of the activity, a category or a sub-category of the activity.

8. The computer-implemented method of claim 6, wherein the one or more robotic parameters are selected from the group consisting of the mobility parameter and one or more additional parameters associated with each robot of the plurality of robots, and the mobility parameter is selected from the group consisting of a degree of freedom of the plurality of robots, a type of movement of the plurality of robots, a range of motion and flexibility in each joint of joints of the plurality of robots, an acceleration and deceleration capability of the plurality of robots, and speed ranges of the plurality of robots, and the one or more additional parameters are selected from the group consisting of a dimensional specification of the plurality of robots, a number and types of joints of the plurality of robots, a payload capacity of the plurality of robots, one or more spatial constraints of the plurality of robots, an external force handling capability of the plurality of robots, precision and an accuracy of each robot of the plurality of robots for the performing of the activity, and types of tools attached with the plurality of robots.

9. The computer-implemented method of claim 1, wherein the one or more environmental characteristics are selected from the group consisting of a location of one or more Regions of Interest (ROIs) associated with the activity within the environment, one or more obstacles in the environment, one or more workpieces located in the environment, a layout of the environment, and a position or an orientation of each robot of the plurality of robots in the environment.

10. The computer-implemented method of claim 9, wherein the collective mobility of the set of robots is determined using a 3D curve fitting technique.

11. The computer-implemented method of claim 1, wherein the determining of the collective mobility of the set of robots comprises:

generating, by the computer, a set of point clouds associated with the obtained mobility parameter for each robot of the set of robots, wherein the mobility parameter corresponds to an ability of each robot of the set of robots to move and navigate in the environment to perform the activity, and the set of point clouds corresponds to data points representing reachable positions and orientations of the set of robots in the environment;

determining, by the computer, a set of coupling points associated with each robot of the set of robots based on the generated set of point clouds;

merging, by the computer, the generated set of point clouds for each robot of the set of robots based on the determined set of coupling points; and determining the collective mobility of the set of robots based on a result of the merging of the generated set of point clouds.

12. The computer-implemented method of claim 1, further comprising:

obtaining, by the computer, a set of inputs associated with the set of robots from a set of sensors while the set of robots are performing the activity in the environment;

determining, by the computer, that the set of robots failed to perform the activity in the environment, based on the obtained set of inputs;

selecting, by the computer, at least one robot from the plurality of robots based on the determining that the set of robots failed to perform the activity in the environment, wherein the at least one robot is selected based on the target mobility threshold, one or more robotic parameters, and the one or more environmental characteristics;

integrating, by the computer, the selected at least one robot with the set of robots; and configuring, by the computer, the selected at least one robot to perform the activity in the environment based on the integration of the selected at least one robot with the set of robots, wherein the integration of the selected at least one robot is performed based on the target mobility threshold, the collective mobility of the selected at least one robot, the one or more robotic parameters, and the one or more environmental characteristics.

13. The computer-implemented method of claim 1, wherein the type of integration corresponds to one of a flexible coupling or a rigid coupling.

14. A system, comprising:

a processor set configured to:

obtain a mobility parameter of a primary robot;

determine a collective mobility of the primary robot and one or more secondary robots from a plurality of robots using an Artificial Intelligence (AI) model, wherein the collective mobility of the primary robot and the one or more secondary robots is a combination of the mobility parameter of the primary robot and the mobility parameter of the one or more secondary robots;

determine that the collective mobility of the primary robot and the one or more secondary robots satisfies a target mobility threshold;

select the one or more secondary robots to perform an activity based on a determination that the collective mobility of the primary robot and the one or more secondary robots satisfies the target mobility threshold, wherein the target mobility threshold is indicative of a mobility for the performance of the activity in an environment based on one or more environmental characteristics, and wherein the one or more secondary robots are selected for enabling the primary robot to perform the activity in the environment;

configure the primary robot and the selected one or more secondary robots to:

integrate in the environment, wherein the configuration of the primary robot and the selected one or more secondary robots to integrate comprises:

validation that a stability of the primary robot and the selected one or more secondary robots satisfies a target stability threshold for the performance of the activity in the environment, wherein the validation is performed using a digital twin simulation technique based on one or more types of forces encountered by the primary robot and the selected one or more secondary robots; and determination of a type of integration, to be performed between the primary robot and the selected one or more secondary robots, based on the target mobility threshold, the collective mobility of the primary robot and the selected one or more secondary robots, the one or more environmental characteristics, and the validating that the stability of the primary robot and the selected one or more secondary robots satisfies the target stability threshold, wherein the configuring the primary robot and the selected one or more secondary robots to integrate in the environment for the performance of the activity is based on the type of integration; and perform, based on the integration of the primary robot and the one or more secondary robots, the activity in the environment.

15. The system of claim 14, wherein the processor set is further configured to determine that the obtained mobility parameter of the primary robot failed to satisfy the target mobility threshold.

16. The system of claim 15, wherein, in the selection of the one or more secondary robots, the processor set is further configured to:

select, based on the determination that the obtained mobility parameter of the primary robot failed to satisfy the target mobility threshold, the one or more secondary robots from the plurality of robots to be integrated with the primary robot for the performance of the activity in the environment, wherein the one or more secondary robots are selected based on one or more robotic parameters of each robot of the plurality of robots, one or more activity parameters, the target mobility threshold, a virtual representation of the environment, and an integration feasibility of the primary robot and the one or more secondary robots to perform the activity.

17. The system of claim 14, wherein the one or more environmental characteristics are selected from a group consisting of a location of one or more Regions of Interest (ROIs) associated with the activity within the environment, one or more obstacles in the environment, one or more workpieces located in the environment, a layout of the environment, and a position or an orientation of each robot of the plurality of robots in the environment.

18. The system of claim 14, wherein the mobility parameter is selected from the group consisting of a degree of freedom of the primary robot and the one or more secondary robots, a type of movement of the primary robot and the one or more secondary robots, a range of motion and flexibility in each joint of joints of the primary robot and the one or more secondary robots, an acceleration and deceleration capability of the primary robot and the one or more secondary robots, and speed ranges of the primary robot and the one or more secondary robots.

19. A computer program product for integration of a set of robots to perform an activity, the computer program product comprising a computer-readable storage medium having program instructions embodied therewith, the program instructions executable by a system to cause the system to:

obtain a mobility parameter of each robot of a plurality of robots;

determine a collective mobility of a set of robots from the plurality of robots, wherein the collective mobility of the set of robots is a combination of the mobility parameter of each robot in the set of robots;

determine that the collective mobility of the set of robots satisfies a target mobility threshold;

configure the set of robots to:

integrate in an environment to perform an activity, wherein the integration is performed based on a determination that the collective mobility of the set of robots satisfies the target mobility threshold, and wherein the target mobility threshold is indicative of a mobility for performing the activity in the environment based on one or more environmental characteristics, and wherein the configuration of the set of robots to integrate comprises:

validation that a stability of the set of robots satisfies a target stability threshold for the performing of the activity in the environment, wherein the validating is performed using a digital twin simulation technique based on one or more types of forces encountered by the set of robots; and determination of a type of integration, to be performed between the set of robots, based on the target mobility threshold, the collective mobility of the set of robots, the one or more environmental characteristics, and the validating that the stability of the set of robots satisfies the target stability threshold, wherein the configuration of the set of robots to integrate in the environment for the performing of the activity, is based on the type of integration; and perform, based on the integration of the set of robots, the activity in the environment.

* * * * *